United States Patent
Rendl et al.

(10) Patent No.: US 12,436,134 B2
(45) Date of Patent: Oct. 7, 2025

(54) OPERATION OF A FLUIDIC SYSTEM

(71) Applicant: Dionex Softron GmbH, Germering (DE)

(72) Inventors: Martin Rendl, Munich (DE); Anne Morgenstern, Gilching (DE)

(73) Assignee: Dionex Softron GmbH, Germering (DE)

( * ) Notice: Subject to any disclaimer, the term of this patent is extended or adjusted under 35 U.S.C. 154(b) by 544 days.

(21) Appl. No.: 17/747,734

(22) Filed: May 18, 2022

(65) Prior Publication Data

US 2023/0033664 A1    Feb. 2, 2023

(30) Foreign Application Priority Data

May 20, 2021 (DE) ...................... 10 2021 113 165.0

(51) Int. Cl.
*G01N 30/32* (2006.01)
*G01N 30/02* (2006.01)

(52) U.S. Cl.
CPC ....... *G01N 30/32* (2013.01); *G01N 2030/027* (2013.01); *G01N 2030/326* (2013.01)

(58) Field of Classification Search
CPC ....... G01N 2030/027; G01N 2030/326; G01N 30/32; G01N 30/34; G01N 30/36
See application file for complete search history.

(56) References Cited

U.S. PATENT DOCUMENTS 4,440,013 A * 4/1984 Adams ............... G01N 30/74
                                                    73/23.39
5,281,406 A * 1/1994 Stalling .............. B82Y 40/00
                                                    423/445 B (Continued)

FOREIGN PATENT DOCUMENTS

| CN | 103512986 A | 1/2014 |
| DE | 10 2016 121 515 A1 | 5/2018 |
| EP | 1918705 B1 | 12/2009 |

*Primary Examiner* — Kristina M Deherrera
*Assistant Examiner* — Gedeon M Kidanu

(57) ABSTRACT

The present invention relates to a method of operating a fluidic system, wherein the fluidic system comprises a fluidic resistive element, wherein the method comprises a defined volume flow step, wherein in the defined volume flow step, a defined volume of a fluid is forced to flow out of the fluidic resistive element, wherein the defined volume is the fluid flowing out of the fluidic resistive element in a first time interval defined by a time $t_{start}$ and a time $t_{end}$, wherein the defined volume flow step comprises: at the time $t_{start}$, switching the system from a first operating state to a second operating state, to bring a pressure in the fluidic resistive element from a first pressure value to a second pressure value, the second pressure value exceeding the first pressure value, and at a time $t_{reduce}$, which is after the time $t_{start}$ and not later than the time $t_{end}$, switching the system to a third operating state to bring the pressure in the fluidic resistive element to a third pressure value, the third pressure value being below the second pressure value. The present invention also relates to a corresponding system and a corresponding computer program product.

13 Claims, 5 Drawing Sheets

(56) References Cited

U.S. PATENT DOCUMENTS

| | | | |
|---|---|---|---|
| 6,843,854 B2* | 1/2005 | Farrenburg | C07H 17/08 |
| | | | 536/7.2 |
| 10,054,569 B2* | 8/2018 | Song | G01N 30/32 |
| 2003/0229213 A1* | 12/2003 | Farrenburg | C07H 17/08 |
| | | | 210/656 |
| 2010/0116021 A1 | 5/2010 | O'Brien | |
| 2011/0005304 A1 | 1/2011 | Vorm | |
| 2019/0064124 A1* | 2/2019 | Witt | G01N 30/32 |
| 2020/0319146 A1* | 10/2020 | Hollnagel | G01N 30/461 |

* cited by examiner

OPERATION OF A FLUIDIC SYSTEM

CROSS-REFERENCE TO RELATED APPLICATION

This application claims the priority benefit under 35 U.S.C. § 119 to German Patent Application No. DE 10 2021 113 165.0 filed on May 20, 2021, the disclosure of which is incorporated herein by reference.

The present invention generally relates to operation of a fluidic system, and more particularly to a fluidic system comprising a fluidic resistive element, for example a chromatography column. More particularly, the present invention relates to loading such a fluidic resistive element with a fluid.

Particular embodiments of the present invention are targeted at the field of chromatography, particularly high performance liquid chromatography (HPLC). However, while the present invention will be described with reference to HPLC, it should be understood that the present invention is not limited thereto, and is also applicable in other fields where a fluidic resistive element is loaded with a fluid. With particular regard to HPLC, it should be understood that HPLC aims to enhance the performance of the chromatographic separation, particularly focusing on improving the reproducibility, accuracy and throughput of chromatographic separation. Moreover, embodiments of the present invention are particularly focused but not limited to the field of low flow HPLC.

In low flow applications, mass spectrometers may be used for detection of analytes. Especially for this very sophisticated detectors, very high utilization times (i.e. data acquisition) are advantageous to operate the system efficiently. Data are only acquired during the gradient step of a chromatographic separation. Hence, high MS utilization can only be achieved if times for transferring the analytical sample onto the analytical column (column loading) as well as equilibration of the column are as low as possible. As the gradient step is normally performed at rather low flow rates and low pressure to increase separation efficiency, column loading and column equilibration can be accelerated by using elevated flow rates utilizing the entire pressure footprint of the system.

However, the volumes delivered during both steps are advantageously accurate and precise to achieve reproducible results. Reproducibility is advantageous in HPLC as identification and quantification is achieved by comparing the sample containing the analyte of interest against a reference of known composition and concentration. Hence, also the reproducibility of the process of column loading is advantageous. Incorrect and imprecise column loading can cause significantly adverse effects on the analytical performance. For instance, if during the column loading step the actually loaded volume onto the analytical column is lower than intended, the corresponding chromatogram in the downstream detection process will accordingly show peaks of incorrectly low peak height and area. Hence, the compound of interest will falsely be quantified to a lower than actual concentration.

In contrast, in the case where the loading volume is higher than intended, early eluting compounds can be eluted inadvertently. As a result, these compounds would either be missing entirely or represented by peaks of incorrectly low peak area and height. Hence, identification and quantification of these compounds would be incorrect.

For column equilibration a reproducibly delivered volume is also advantageous, as the column equilibration directly affects the next gradient separation. In case the delivered volume was too low, a too high amount of organic solvent is still present on the column and separation efficiency will decrease significantly. Retention times will shift unpredictably, co-elution of peaks might be observed which again leads to incorrect identification and quantitation of these compounds. If the delivered volume is too high time for equilibration increases and the MS utilization time decreases.

EP 1918705 A1 discloses a device and a method of loading a sample into a trapping device. While this technology disclosed in EP 1918705 A1 may be satisfactory in some regards, it has certain drawbacks and limitations, in particular with regard to precision and efficiency of the loading process.

US 2011/0005304 A1 also discloses a system and method of controlling fluid flow in a liquid chromatography apparatus.

In light of the above, it is an object of the present invention to provide a technology allowing a defined volume to be loaded into a fluid resistive element, e.g., into a chromatographic column. In particular, the technology should be relatively accurate and also time efficient.

These objects are achieved by the present invention.

In a first aspect, the present invention relates to a method of operating a fluidic system, wherein the fluidic system comprises a fluidic resistive element, wherein the method comprises a defined volume flow step, wherein in the defined volume flow step, a defined volume of a fluid is forced to flow out of the fluidic resistive element, wherein the defined volume is the fluid flowing out of the fluidic resistive element in a first time interval defined by a time $t_{start}$ and a time $t_{end}$, wherein the defined volume flow step comprises at the time $t_{start}$, switching the system from a first operating state to a second operating state, to bring a pressure in the fluidic resistive element from a first pressure value to a second pressure value, the second pressure value exceeding the first pressure value, at a time $t_{reduce}$, which is after the time $t_{start}$ and not later than the time $t_{end}$, switching the system to a third operating state to bring the pressure in the fluidic resistive element to a third pressure value, the third pressure value being below the second pressure value. In the following, an operating state may be understood as a configuration of the fluidic system that may comprise, for example, an operating pressure, a particular configuration of fluidic connections between parts of the fluidic system. An advantage of the method as described above may be to allow loading of fluid on to a trap column, for example, at pressures close to the maximum pressure footprint of the fluidic system which may make the loading process more efficient as compared to, e.g., a flow-controlled loading process.

The third pressure value may be lower than, equal to, or exceed the first pressure value. For example, the third pressure value may correspond to a pressure for injecting a sample into a separation column, the second pressure may be a pressure for loading the fluidic resistive element, and the first pressure may be a pressure during equilibration. If loading and/or equilibration shall be accelerated, a higher pressure compared the third pressure (for sample injection into the column) may be used. In this case, the third pressure value may be below the first pressure value used for equilibration. If only the loading phase is accelerated (e.g. through pressure controlled operation) both equilibration as well as the gradient phase will have about the same pressure level—at least during the start of a possible gradient operation. This is because typically the gradient start conditions are employed for equilibration of the column. Thus, in such a case, the first pressure and the third pressure would be at least approximately equal to one another. However, it is also possible that the equilibration is performed at a pressure lower than the pressure during sample injection, such that the third pressure value may also exceed the first pressure value.

The fluidic system may further comprise a high pressure section upstream of the fluidic resistive element.

The method may comprise maintaining the system in the second operating state from $t_{start}$ to $t_{reduce}$.

The system may comprise a pump system upstream of the high pressure section. For example, maintaining the system in the second operating state from $t_{start}$ to $t_{reduce}$ may comprise maintaining an operating pressure of the pump system at the second pressure value.

Switching the system from the first operating state to the second operating state may comprise switching the pump system. This may involve, for example, switching the operating pressure of the pump system to the second pressure value. Generally, switching the pump system should be understood to comprise changing the pump operating parameters (e.g., the pressure or its flow) or the composition of a solvent mixture delivered by the pump.

Switching the system to the third operating state may also comprise switching the pump system.

Switching the system to the third operating state may comprise switching the high pressure section to the third pressure value at the time $t_{reduce}$.

Switching the system to the third operating state may further comprise switching the pump system to zero flow at the time $t_{reduce}$. This may comprise actively regulating the operating pressure of the pump to match the pressure downstream of the pump. It may be advantageous to switch the pump to zero flow in ensuring delivery of accurate volumes of fluid to the fluidic resistive element as measurement of volume that flows out of the pump during switching to a lower pressure may be complex and may require additional sensors.

Switching the system to the third operating state comprises venting the high pressure section.

The pump system may be further configured to supply at least one solvent.

Additionally, the pump system may be configured to supply a solvent mixture of a first solvent and a second solvent in different mixing ratios, wherein the pump system may comprise a first pump configured to supply the first solvent, a second pump configured to supply the second solvent, and a mixing unit downstream of the first pump and the second pump. A solvent mixture may be of particular advantage in cases where the fluidic system is used for a gradient separation process. Here, the composition of the solvent mixture may be continuously varied, typically with the concentration of a stronger solvent increasing over time, so as to allow compounds with higher solubilities to get eluted first, followed by dissolution of compounds that may be harder to dissolve in the solvent mixture with a higher concentration of the strong solvent.

The mixing unit may be a mixing T. The mixing T may comprise a mixer with robust performance for a variety of solvent ratios, solvent miscibility, and flow rates. It may, therefore, be provided with a mechanism to aid the mixing process. For example, it may be of a Dionex SpinFlow mixing design, that comprises both radial and longitudinal mixing paths and may be operated up to pressure of 103 MPa.

The time $t_{start}$ and the time $t_{reduce}$ may define a second time interval.

The pump system may supply the solvent mixture with the first solvent exceeding 20 vol-%, preferably exceeding 50 vol-% of the solvent mixture in the second time interval.

The pump system may supply the solvent mixture with the first solvent constituting 100% of the solvent mixture in the second time interval. For example, the first solvent may be a loading solvent used to load a sample on to the fluidic resistive element, that may be a trap column. In this case, it may be a strong solvent such that all of the sample is dissolved in the loading flow. It may also happen that some volume of the first solvent flows into the fluidic channel of a second solvent owing to errors in the zero position of a flow rate sensor for the second solvent pump, for example. A washing, or flushing out, step may then be required to ensure that the fluidic channels of the second solvent reliably contain the second solvent only.

The method described above may further comprise at a time $t_{wash}$, which is after the time $t_{reduce}$ and before the time $t_{end}$, switching the pump system and the pump system after $t_{wash}$ supplying the solvent mixture with the second solvent exceeding 20 vol-% of the solvent mixture, and the second solvent preferably constituting 100% of the solvent mixture, after $t_{wash}$. For example, the second solvent may be a weak solvent and a subsequent gradient separation step may require a starting composition of the solvent mixture comprising the weak solvent at a high concentration. In case the fluidic channels containing solvent B before the mixing unit are not flushed out, the resulting mixture downstream of the mixing unit would contain a higher concentration of the first (stronger) solvent and would adversely affect the separation process.

The method may further comprise the pump system supplying a washing volume $V_{B\_wash}$ of the solvent mixture in a washing time interval $\Delta t_{wash}$ starting at the time $t_{wash}$. The precise time interval $\Delta t_{wash}$ may depend on the relative concentrations of the first and second solvent being delivered during the second time interval. A higher relative concentration of the first solvent would require a longer washing duration $\Delta t_{wash}$.

The fluidic system described above may further comprise a sample storage section. For e.g., the sample storage section may be a sample loop. Sample loops may have the advantage of reliably providing a defined storage volume. Knowing this defined volume may allow the sample loop to also be used for parking the outflows in, for example, the washing step above.

The sample storage section may be fluidly connected to the pump system and downstream of the pump system in a time interval defined by the time $t_{start}$ and the time $t_{reduce}$. This may be the preferred embodiment when the fluidic resistive element is a trap column and the above method is used to load the sample on to the trap column.

The sample storage section may also be fluidly connected to the pump system and downstream of the pump system in a time interval starting with the time $t_{wash}$. This may be the case when the sample storage section is used to park outflows in the washing step, for example.

The sample storage section may further be fluidly connected to the pump system and downstream of the pump system in a time interval defined by $t_{reduce}$ and $t_{wash}$. This may help to bring down the pressure in the sample loop and may prevent cross-flows between, for example, 2 solvent channels of the pump system, and sudden changes of pressure if, for example, the sample loop needs to be disconnected from the analytical path after loading in the second time interval. The pressure reduction by the pump may help to accelerate the process of decompressing the sample storage section.

Alternatively, the sample storage section may not be fluidly connected to the pump system in a time interval defined by $t_{reduce}$ and $t_{wash}$.

For example, the sample storage section can also be fluidly connected to a metering device in the time interval defined by $t_{reduce}$ and $t_{wash}$.

Switching the system to the third operating state may further comprise switching the sample storage section from the second pressure value to the third pressure value at the time $t_{reduce}$.

The fluidic system may further comprise a metering device, and the method may further comprise using the metering device to switch the sample storage section from the second pressure value to the third pressure value. This may be done with the sample storage section fluidly disconnected from the analytical flow path, as otherwise the fluidic resistance of the system would be significantly large and more energy would be required to decompress the sample storage section using the metering device.

Alternatively, the fluidic system may comprise a pump, and the method may comprise using the pump to switch the sample storage section from the second pressure value to the third pressure value.

Further alternatively, the method may comprise venting the sample storage section to switch the sample storage section from the second pressure value to the third pressure value.

Switching the system described above to the third operating state may comprise switching the pump system to operate the third pressure value. This may result in a negative flow into the pump system for a short period of time that may have to be measured to accurately determine the volume of fluid delivered to the fluidic resistive element.

The method may comprise at a time, $t_{align}$, which is after the time $t_{reduce}$ and before the time $t_{end}$, switching the pump system to supply the solvent mixture with a defined mixing ratio. For example, as described above, it may be advantageous to change the composition to a high concentration of weak solvent and low concentration of strong solvent at $t_{align}$, whereas it may be preferable to have a different high concentration of weak solvent and low concentration of strong solvent at $t_{start}$ to allow for fast loading and controlled gradient separation. An alignment phase may then help to achieve the preferred mixing ratio.

The method may further comprise the pump system supplying an alignment volume $V_{align}$ of the solvent mixture in an alignment time interval $\Delta t_{align}$ starting at the time $t_{align}$, wherein the alignment time interval $\Delta t_{align}$ preferably ends at the end time $t_{end}$. The length of the time interval $\Delta t_{align}$ may be determined by the relative concentrations of strong and weak solvents required for a subsequent gradient separation step. For example, a higher concentration of the strong solvent at the start of the gradient separation step may lead to a longer $\Delta t_{align}$.

The time $t_{align}$ may be after the time $t_{wash}$ to ensure that the fluidic channels connecting any of the pumps in the pump system to the mixing unit are reliably filled only with the solvents being pumped and to compensate for any cross-flows that may have occurred in the preceding phases.

The sample storage section as described above may be fluidically connected to the pump system in the alignment time interval $\Delta t_{align}$. This may be done, again, to park outflows from the pump system into the sample storage section.

The sample storage section may remain fluidically connected to the pump system until the time $t_{end}$.

The defined mixing ratio described above may be supplied in the alignment time interval $\Delta t_{align}$. For example, the defined mixing ratio may comprise an increasing concentration of the strong solvent, for example, increasing to 2 vol-% of strong solvent (and 98 vol-% of weak solvent) from 0 vol-% of strong solvent, in the time interval $\Delta t_{align}$, where a solvent mixture comprising 100 vol-% weak solvent may have been delivered prior to $t_{align}$ in a washing phase.

The fluidic resistive element may be a chromatographic column, preferably a separation column.

The fluidic system may be a liquid chromatography system and preferably a high performance liquid chromatography system.

The defined volume flow step defined above may additionally constitute loading a sample onto the chromatographic column.

The method may further comprise a separation step, starting at time $t_{end}$, wherein the solvent mixture may be supplied by the pump system to the chromatographic column.

The solvent mixture supplied at time $t_{end}$ may comprise a starting separation mixing ratio.

The solvent mixture may have a mixing ratio varying overtime after the time $t_{end}$. For example, a typical mixing ratio may start at 2 vol-% of a strong solvent (and 98 vol-% of a weak solvent) at $t_{end}$ to 40 vol-% of the strong solvent at the end.

The defined mixing ratio described above may be identical to the starting separation mixing ratio. The defined mixing ratio may be the mixing ratio at the end of the alignment phase.

The sample storage section described above may not be fluidly connected to the chromatographic column in the separation step.

The fluidic system may comprise at least one flow rate sensor, and the method may comprise using the flow rate sensor to measure a flow rate of fluid flowing through the fluidic resistive element.

The fluidic system may further comprise at least one flow rate sensor upstream of the fluidic resistive element, and the method may further comprise using the flow rate sensor to measure a pumping flow rate of fluid displaced by the pump system. The two flow rate measurements described above may be compared to determine attainment of an equilibrium state, where the flow rate of fluid displaced by the pump system is identical to the flow rate of fluid flowing through the fluidic resistive element. This may serve to define the time $t_a$.

The method may further comprise using the pumping flow rate to determine a total volume of fluid displaced by the pump system up to a given time.

The method may comprise a pressurization time interval $\Delta t_{build-up}$ between the start time $t_{start}$ and a time $t_a$, wherein a pressure in the fluidic resistive element rises from the first pressure value to the second pressure value. The method may further comprise determining a build up volume $V_{build-up}$ of fluid flowing out of the fluidic resistive element in the pressurization time interval $\Delta t_{build-up}$.

The method may comprise a constant pressure time interval $\Delta t_{const-load}$ between the time $t_a$ and $t_{reduce}$, wherein the pressure in the fluidic resistive element is at the second pressure value during the constant pressure time interval $\Delta t_{const-load}$. The method may further comprise determining a constant pressure volume $V_{const-load}$ of fluid flowing out of the fluidic resistive element in the constant pressure time interval $\Delta t_{const-load}$.

The method may comprise a depressurization time interval $\Delta t_{reduction}$, which starts at the time $t_{reduce}$, wherein the pressure is reduced from the second pressure value to the third pressure value. The method may further comprise determining a reduction volume $V_{reduce}$ of fluid flowing out of the fluidic resistive element in the depressurization time interval $\Delta t_{reduction}$.

The method may further comprise determining $t_{reduce}$ by taking into account any of the build up volume $V_{build-up}$, the constant pressure volume $V_{const-load}$, the constant reduction volume $V_{reduce}$, the washing volume $V_{B\_wash}$, or the alignment volume $V_{align}$. The loading process may be ended once the sum total of the volumes $V_{build-up}$, $V_{const-load}$, $V_{reduce}$, $V_{B\_wash}$, and $V_{align}$ is equal to the defined volume of fluid to be forced out of the fluidic resistive element.

The third pressure value may be identical to the pressure in the separation step. This may be the case when a separation step is to be carried out after a loading step. Alternatively, when the above method is used to wash and equilibrate a trap column, for instance, the third pressure value may be chosen equal to an equilibration pressure value.

The pressure in the separation step may be between 20 and 1500 bar, preferably between 200 and 1500 bar.

The first pressure value may be between 1 and 1500 bar.

The second pressure value may be between 200 and 2000 bar, preferably between 800 bar and 1500 bar.

The third pressure value may be between 20 and 1500 bar.

At least one of the at least one solvent described above may be any of an organic solvent, an inorganic solvent, a polar solvent, and a non-polar solvent.

According to a second aspect, the present invention relates to a fluidic system, wherein the fluidic system comprises a fluidic resistive element, wherein the fluidic system comprises a control unit, and wherein the fluidic system is configured to perform any of the methods described above.

The fluidic system may comprise a high pressure section upstream of the fluidic resistive element.

The fluidic system may comprise a pump system upstream of the high pressure section.

The pump system may be configured to supply at least one solvent.

The pump system may be configured to supply a solvent mixture of a first solvent and a second solvent in different mixing ratios, wherein the pump system comprises a first pump configured to supply the first solvent, a second pump configured to supply the second solvent, and a mixing unit downstream of the first pump and the second pump.

The mixing unit may be a mixing T.

The fluidic system may comprise a sample storage section.

The sample storage section may be a sample loop.

The fluidic resistive element may be a chromatographic column, preferably a separation column.

The fluidic system may be a liquid chromatography system and preferably a high performance liquid chromatography system.

The system may comprise at least one flow rate sensor.

The system may further comprise a bypass line, and the system may be configured to assume a first configuration, wherein the pump system, the sample storage section and fluidic resistive element are fluidly connected to one another, and a second configuration, wherein the pump system and the fluidic resistive element are fluidly connected to one another by means of the bypass line and without the sample storage section being fluidly connected to the fluidic resistive element.

The pump system may comprise two pumps, each one configured to supply a different solvent.

According to a third aspect, the present invention relates to use of the system described above for performing a method according to any of the methods described above.

According to a fourth aspect, the present invention relates to a computer program product comprising instructions, wherein the instructions are configured, when run on a control unit of a fluidic system, to cause the fluidic system to perform the method according to any of the preceding method embodiments. For example, such a program may comprise instructions for changing an operating pressure of a pump upstream of the fluidic resistive element based on the volume of fluid already delivered through the fluidic resistive element. It may be particularly advantageous in regulating the flow downstream of the pump to zero at the time $t_{reduce}$ in embodiments, where an active regulation of the operating pressure may be needed.

The present invention also relates to the following numbered embodiments.

Below, method embodiments will be discussed. These embodiments are indicated by the letter M followed by a number. Whenever reference is herein made to method embodiments, these embodiments are meant.

M1. A method of operating a fluidic system, wherein the fluidic system comprises a fluidic resistive element,
wherein the method comprises a defined volume flow step, wherein in the defined volume flow step, a defined volume of a fluid is forced to flow out of the fluidic resistive element, wherein the defined volume is the fluid flowing out of the fluidic resistive element in a first time interval defined by a time $t_{start}$ and a time $t_{end}$,
wherein the defined volume flow step comprises
at the time $t_{start}$, switching the system from a first operating state to a second operating state, to bring a pressure in the fluidic resistive element from a first pressure value to a second pressure value, the second pressure value exceeding the first pressure value,
at a time $t_{reduce}$, which is after the time $t_{start}$ and not later than the time $t_{end}$, switching the system to a third operating state to bring the pressure in the fluidic resistive element to a third pressure value, the third pressure value being below the second pressure value.

M2. The method according to the preceding embodiment, wherein the third pressure value exceeds the first pressure value.

M3. The method according to any of the preceding embodiments, wherein the fluidic system comprises a high pressure section upstream of the fluidic resistive element.

M4. The method according to any of the preceding embodiments,
wherein the method comprises maintaining the system in the second operating state from $t_{start}$ to $t_{reduce}$.

M5. The method according to any of the preceding embodiments with the features of embodiment M3, wherein the system comprises a pump system upstream of the high pressure section.

M6. The method according to the preceding embodiment, wherein switching the system from the first operating state to the second operating state comprises switching the pump system.

M7. The method according to any of the 2 preceding embodiments, wherein switching the system to the third operating state comprises switching the pump system.

M8. The method according to the preceding embodiment and with the features of embodiment M3, wherein switching the system to the third operating state comprises switching the high pressure section to the third pressure value at the time $t_{reduce}$.

M9. The method according to the penultimate embodiment, wherein switching the system to the third operating state comprises switching the pump system to zero flow at the time $t_{reduce}$.

M10. The method according to any of the preceding embodiments with the feature of embodiment M3, wherein switching the system to the third operating state comprises venting the high pressure section.

M11. The method according to any of the preceding embodiments with the features of embodiment M5, wherein the pump system is configured to supply at least one solvent.

M12. The method according to the preceding embodiment, wherein the pump system is configured to supply a solvent mixture of a first solvent and a second solvent in different mixing ratios, wherein the pump system comprises a first pump configured to supply the first solvent, a second pump configured to supply the second solvent, and a mixing unit downstream of the first pump and the second pump.

M13. The method according to the preceding embodiment, wherein the mixing unit is a mixing T.

M14. The method according to any of the preceding embodiments, wherein the time $t_{start}$ and the time $t_{reduce}$ define a second time interval.

M15. The method according to the preceding embodiment and with the features of embodiment M13, wherein in the second time interval, the pump system supplies the solvent mixture with the first solvent exceeding 20 vol-% E, preferably exceeding 50% of the solvent mixture.

M16. The method according to the preceding embodiment, wherein in the second time interval, the pump system supplies the solvent mixture with the first solvent constituting 100% of the solvent mixture.

M17. The method according to any of the preceding embodiments with the features of embodiment M12, wherein the method further comprises at a time $t_{wash}$, which is after the time $t_{reduce}$ and before the time $t_{end}$, switching the pump system and the pump system after $t_{wash}$ supplying the solvent mixture with the second solvent exceeding 20 vol-% of the solvent mixture, and the second solvent preferably constituting 100% of the solvent mixture, after $t_{wash}$.

M18. The method according to the preceding embodiment, wherein the method further comprises the pump system supplying a washing volume $V_{B\_wash}$ of the solvent mixture in a washing time interval $\Delta t_{wash}$ starting at the time $t_{wash}$.

M19. The method according to any of the preceding embodiments, wherein the fluidic system comprises a sample storage section.

M20. The method according to the preceding embodiment, wherein the sample storage section is a sample loop.

M21. The method according to any of the 2 preceding embodiments and with the features of embodiment M12, wherein the sample storage section is fluidly connected to the pump system and downstream of the pump system in a time interval defined by the time $t_{start}$ and the time $t_{reduce}$.

M22. The method according to any of the preceding embodiments with the features of embodiments M12, M17, and M19, wherein the sample storage section is fluidly connected to the pump system and downstream of the pump system in a time interval starting with the time $t_{wash}$.

M23. The method according to any of the preceding embodiments and with the features of embodiments M12, M17, and M19, wherein the sample storage section is fluidly connected to the pump system and downstream of the pump system in a time interval defined by $t_{reduce}$ and $t_{wash}$.

M24. The method according to any of the preceding embodiments, except for embodiment M23, and with the features of embodiments M12, M17, and M19, wherein the sample storage section is not fluidly connected to the pump system in a time interval defined by $t_{reduce}$ and $t_{wash}$.

M25. The method according to the preceding embodiment and with the features of embodiment M21, wherein switching the system to the third operating state further comprises switching the sample storage section from the second pressure value to the third pressure value at the time $t_{reduce}$.

M26. The method according to the preceding embodiment, wherein the fluidic system further comprises a metering device, and wherein the method further comprises using the metering device to switch the sample storage section from the second pressure value to the third pressure value.

M27. The method according to the penultimate embodiment, wherein the fluidic system further comprises a pump, and wherein the method further comprises using the pump to switch the sample storage section from the second pressure value to the third pressure value.

M28. The method according to any of the preceding embodiments and with the features of embodiment M25, wherein the method further comprises venting the sample storage section to switch the sample storage section from the second pressure value to the third pressure value.

M29. The method according to any of the preceding embodiments with the features of embodiment M5, wherein switching the system to the third operating state comprises switching the pump system to operate the third pressure value.

M30. The method according to any of the preceding embodiments and with the features of embodiment M12, wherein the method comprises at a time, $t_{align}$, which is after the time $t_{reduce}$ and before the time $t_{end}$, switching the pump system to supply the solvent mixture with a defined mixing ratio.

M31. The method according to the preceding embodiment, wherein the method further comprises the pump system supplying an alignment volume $V_{align}$ of the solvent mixture in an alignment time interval $\Delta t_{align}$ starting at the time $t_{align}$, wherein the alignment time interval $\Delta t_{align}$ preferably ends at the end time $t_{end}$.

M32. The method according to the penultimate embodiment and with the features of embodiment M18, wherein the time $t_{align}$ is after the time $t_{wash}$.

M33. The method according to any of the 3 preceding embodiments and with the features of embodiments M12, and M19, wherein the sample storage section is fluidly connected to the pump system in the alignment time interval $\Delta t_{align}$.

M34. The method according to the preceding embodiment, wherein the sample storage section remains fluidly connected to the pump system until the time $t_{end}$.

M35. The method according to any of the preceding embodiments and with the features of embodiment M30, wherein the defined mixing ratio is supplied in the alignment time interval $\Delta t_{align}$.

M36. The method according to any of the preceding embodiments, wherein the fluidic resistive element is a chromatographic column, preferably a separation column.

M37. The method according to any of the preceding embodiments, wherein the fluidic system is a liquid chromatography system and preferably a high performance liquid chromatography system.

M38. The method according to any of the preceding embodiments with the features of embodiment M36, wherein the defined volume flow step constitutes loading a sample onto the chromatographic column.

M39. The method according to any of the preceding embodiments with the features of embodiments M12, and M36, wherein the method further comprises
- a separation step, starting at time $t_{end}$, wherein the solvent mixture is supplied by the pump system to the chromatographic column.

M40. The method according to the preceding embodiment, wherein the solvent mixture supplied at time $t_{end}$ comprises a starting separation mixing ratio.

M41. The method according to the preceding embodiment, wherein the solvent mixture has a mixing ratio varying over time after the time $t_{end}$.

M42. The method according to any of the 2 preceding embodiment and with the features of embodiment M30, wherein the defined mixing ratio is identical to the starting separation mixing ratio.

M43. The method according to any of the 4 preceding embodiments, and with the features of embodiment M19,
- wherein the sample storage section is not fluidly connected to the chromatographic column in the separation step.

M44. The method according to any of the preceding embodiments, wherein the fluidic system comprises at least one flow rate sensor, and wherein
- the method further comprises using the flow rate sensor to measure a flow rate of fluid flowing through the fluidic resistive element.

M45. The method according to any of the preceding embodiments and with the features of embodiment M5, wherein the fluidic system further comprises at least one flow rate sensor, and wherein
- the method further comprises using the flow rate sensor to measure a pumping flow rate of fluid displaced by the pump system.

M46. The method according to the preceding embodiment, wherein the method further comprises using the pumping flow rate to determine a total volume of fluid displaced by the pump system up to a given time.

M47. The method according to any of the preceding embodiments,
- wherein the method comprises a pressurization time interval $\Delta t_{build-up}$ between the start time $t_{start}$ and a time $t_a$, wherein a pressure in the fluidic resistive element rises from the first pressure value to the second pressure value, and wherein the method comprises determining a build up volume $V_{build-up}$ of fluid flowing out of the fluidic resistive element in the pressurization time interval $\Delta t_{build-up}$.

M48. The method according to the preceding embodiment,
- wherein the method comprises a constant pressure time interval $\Delta t_{const-load}$ between the time $t_a$ and $t_{reduce}$, wherein the pressure in the fluidic resistive element is at the second pressure value during the constant pressure time interval $\Delta t_{const-load}$, and wherein the method comprises determining a constant pressure volume $V_{const-load}$ of fluid flowing out of the fluidic resistive element in the constant pressure time interval $\Delta t_{const-load}$.

M49. The method according to any of the preceding embodiments,
- wherein the method comprises a depressurization time interval $\Delta t_{reduction}$, which starts at the time $t_{reduce}$, wherein the pressure is reduced from the second pressure value to the third pressure value, and wherein the method comprises determining a reduction volume $V_{reduce}$ of fluid flowing out of the fluidic resistive element in the depressurization time interval $\Delta t_{reduction}$.

M50. The method according to any of the preceding embodiments, wherein the method further comprises determining $t_{reduce}$.

M51. The method according to the preceding embodiment and with the features of embodiment M47, wherein determining $t_{reduce}$ comprises taking into account the build up volume $V_{build-up}$.

M52. The method according to any of the preceding embodiments with the features of embodiment M50 and M48, wherein determining $t_{reduce}$ comprises taking into account the constant pressure volume $V_{const-load}$.

M53. The method according to any of the preceding embodiments with the features of embodiment M50 and M49, wherein determining $t_{reduce}$ comprises taking into account the constant reduction volume $V_{reduce}$.

M54. The method according to any of the preceding embodiments with the features of embodiment M50 and M18, wherein determining $t_{reduce}$ comprises taking into account the washing volume $V_{B\_wash}$.

M55. The method according to any of the preceding embodiments with the features of embodiment M50 and M31, wherein determining $t_{reduce}$ comprises taking into account the alignment volume $V_{align}$.

M56. The method according to any of the preceding embodiments and with the features of embodiment M39, wherein the third pressure value is identical to the pressure in the separation step.

M57. The method according to any of the preceding embodiments and with the features of embodiment M39, wherein the pressure in the separation step is between 20 and 1500 bar, preferably between 200 and 1500 bar.

M58. The method according to any of the preceding embodiments, wherein the first pressure value is between 1 and 1500 bar.

M59. The method according to any of the preceding embodiments, wherein the second pressure value is between 200 and 2000 bar, preferably between 800 bar and 1500 bar.

M60. The method according to any of the preceding embodiments, wherein the third pressure value is between 20 and 1500 bar.

M61. The method according to any of the preceding embodiments and with the features of embodiment M11, wherein at least one of the at least one solvent is an organic solvent.

M62. The method according to any of the preceding embodiments and with the features of embodiment M11, wherein at least one of the at least one solvent is an inorganic solvent.

M63. The method according to any of the preceding embodiments and with the features of embodiment M11, wherein at least one of the at least one solvent is a polar solvent.

M64. The method according to any of the preceding embodiments and with the features of embodiment M11, wherein at least one of the at least one solvent is a non-polar solvent.

M65. The method according to any of the preceding embodiments and with the features of embodiment M9, wherein switching the pump system to zero flow comprises actively regulating the operating pressure of the pump to match the pressure downstream of the pump.

M66. The method according to any of the preceding embodiments without the features of embodiment M2, wherein the third pressure value is lower than the first pressure value.

M67. The method according to any of the preceding embodiments without the features of embodiments M2, and M66, wherein the third pressure value is identical to the first pressure value.

Below, system embodiments will be discussed. These embodiments are indicated by the letter S followed by a number. Whenever reference is herein made to system embodiments, these embodiments are meant.

S1. A fluidic system, wherein the fluidic system comprises a fluidic resistive element, wherein the fluidic system comprises a control unit, and wherein the fluidic system is configured to perform the method according to any of the preceding method embodiments.

S2. The system according to the preceding embodiment, wherein the fluidic system comprises a high pressure section upstream of the fluidic resistive element.

S3. The system according to the preceding embodiment, wherein the system comprises a pump system upstream of the high pressure section.

S4. The system according to the preceding embodiment, wherein the pump system is configured to supply at least one solvent.

S5. The system according to the preceding embodiment, wherein the pump system is configured to supply a solvent mixture of a first solvent and a second solvent in different mixing ratios, wherein the pump system comprises a first pump configured to supply the first solvent, a second pump configured to supply the second solvent, and a mixing unit downstream of the first pump and the second pump.

S6. The system according to the preceding embodiment, wherein the mixing unit is a mixing T.

S7. The system according to any of the preceding system embodiments, wherein the fluidic system comprises a sample storage section.

S8. The system according to the preceding embodiment, wherein the sample storage section is a sample loop.

S9. The system according to any of the preceding system embodiments, wherein the fluidic resistive element is a chromatographic column, preferably a separation column.

S10. The system according to any of the preceding system embodiments, wherein the fluidic system is a liquid chromatography system and preferably a high performance liquid chromatography system.

S11. The system according to any of the preceding embodiment, wherein the system comprises at least one flow rate sensor.

S12. The system according to any of the preceding system embodiments with the features of embodiments S3 and S7, wherein the system further comprises a bypass line, wherein the system is configured to assume a first configuration, wherein the pump system, the sample storage section and fluidic resistive element are fluidly connected to one another, and a second configuration, wherein the pump system and the fluidic resistive element are fluidly connected to one another by means of the bypass line and without the sample storage section being fluidly connected to the fluidic resistive element.

S13. The system according to any of the preceding system embodiments with the features of embodiment S3, wherein the pump system comprises two pumps, each one configured to supply a different solvent.

U1. Use of the system according to any of the preceding system embodiments for performing a method according to any of the preceding method embodiments, P1. A computer program product comprising instructions, wherein the instructions are configured, when run on a control unit of a fluidic system, to cause the fluidic system to perform the method according to any of the preceding method embodiments.

The invention will now be described with references to the accompanying drawings, which should only exemplify, but not limit, the scope of the present invention.

Figure 1:
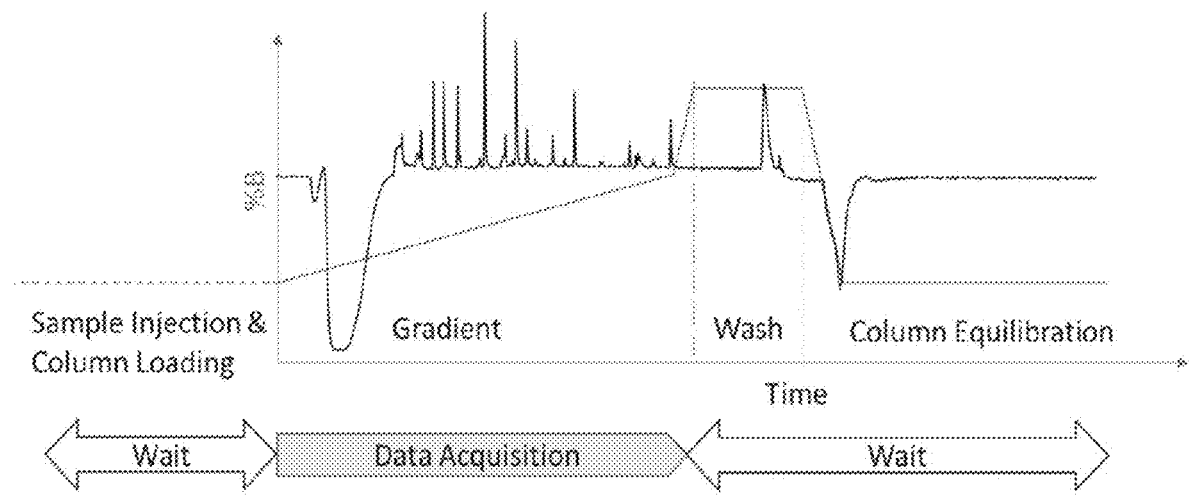
FIG. 1 depicts phases of operation in a liquid chromatography system.
Figure 6:
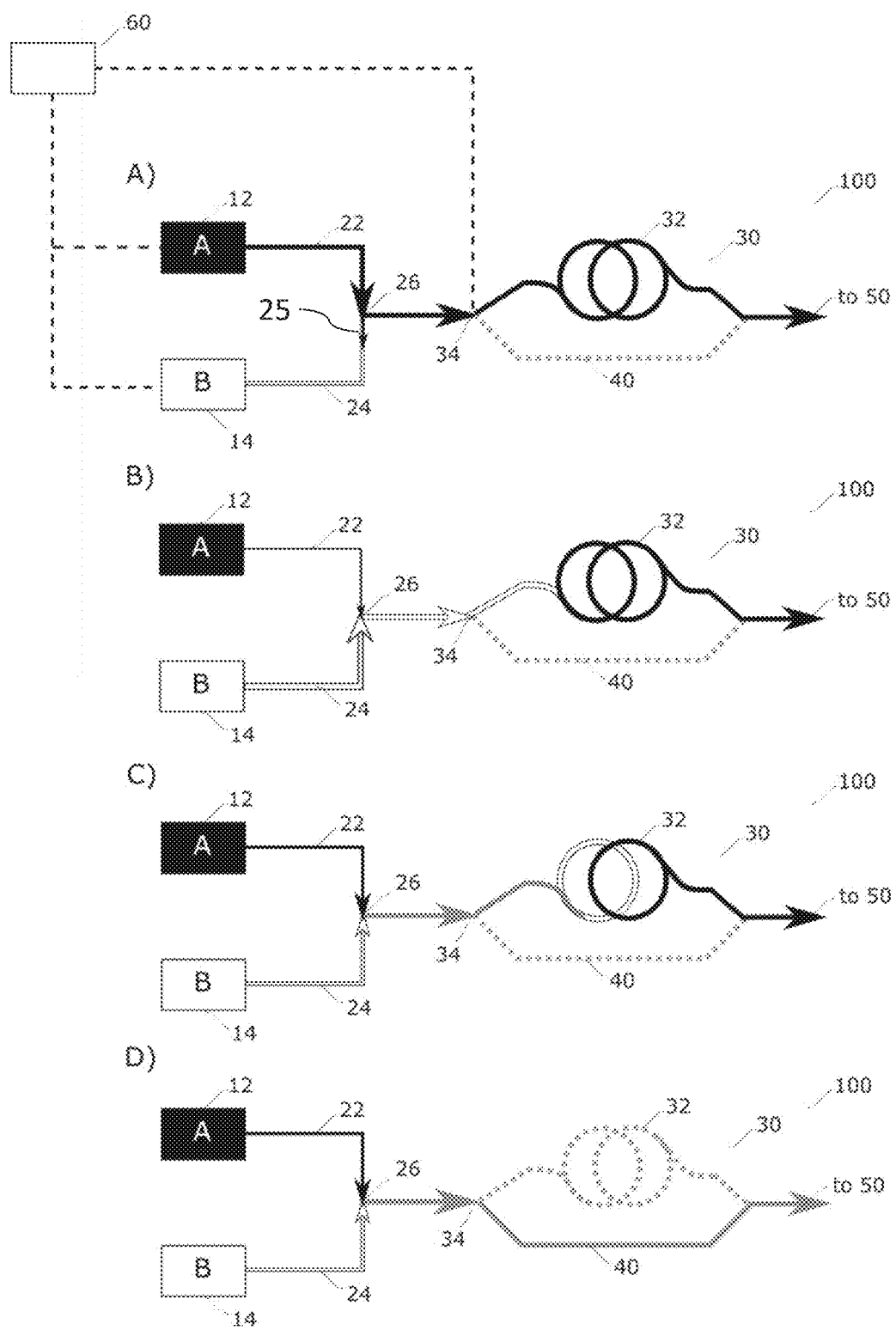
FIG. 6 depicts an exemplary fluidic system in different operation modes.

FIG. 1 shows a typical gradient separation. In that regard, it is noted that embodiments of the present technology relate to fluidic systems, e.g., fluidic systems used in liquid chromatography (LC), such as high performance liquid chromatography (HPLC). An exemplary fluidic system 100 that may be used in LC is depicted in FIG. 6. The fluidic system 100, that may also just be referred to as system 100, comprises two pumps 12, 14, that may supply different solvents. Each of the pumps 12, 14, is connected to a respective channel 22, 24, and the channels 22, 24 join each other at a mixing unit 26 (e.g., a mixing tee). Downstream of the mixing unit 26, two flow paths 30, 40 are provided, wherein one of the flow paths 30 comprises a sample storage portion 32 (e.g., a sample loop 32) and the other flow path 40 may be referred to as a bypass line. The system 100 also comprises a valve 34 for selecting which of the flow paths 30, 40 is selected. That is, the system 100 may be adapted (e.g., by means of at least one valve) to choose which of the flow paths 30, 40 is fluidly connected to the mixing unit 26. The flow paths 30, 40, may join each other and further downstream, a separation column 50 (as an example for a fluidic resistive element 50) may be provided.

Furthermore, as depicted in FIG. 6 (A), the system 100 may also comprise a controller 60, which may also be referred to as control unit 60. For ease of illustration, this controller 60 is only depicted in FIG. 6 (A). However, it should be understood that this controller 60 is also present in the states depicted in FIGS. 6 (B) to (D). The controller 60 can be operatively connected to other components, as depicted by dashed lines in FIG. 6. More particularly, the controller 60 may be operatively connected to the pumps 12, 14, and to the valve 34.

The controller 60 can include a data processing unit and may be configured to control the system and carry out particular method steps. The controller can send or receive electronic signals for instructions. The controller can also be referred to as a microprocessor. The controller can be contained on an integrated-circuit chip. The controller can include a processor with memory and associated circuits. A microprocessor is a computer processor that incorporates the functions of a central processing unit on a single integrated circuit (IC), or sometimes up to a plurality of integrated circuits, such as 8 integrated circuits. The microprocessor may be a multipurpose, clock driven, register based, digital integrated circuit that accepts binary data as input, processes it according to instructions stored in its memory and provides results (also in binary form) as output. Microprocessors may contain both combinational logic and sequential digital logic. Microprocessors operate on numbers and symbols represented in the binary number system.

Furthermore, it should be understood that the system may be configured to measure pressures at different locations of the system. For example, the system may comprise a plurality of pressure sensors. For example, a first pressure sensor may be located in the pump 12, and a second pressure sensor may be located in pump 14. These pressure sensors may also be operatively connected to the controller 60, and the controller 60 may use readings of these pressure sensors when controlling the operation of the system. The pressure sensors may be configured to measure the pressure directly. However, it should be understood that also other parameters may be measured and may be used to determine the respective pressures (and that such a procedure should also be understood as a pressure measurement and the components involved should be understood as pressure sensors). For example, it will be understood that when an analytical pump 12, 14 supplies a solvent at a flow rate, the power consumption of the analytical pump 12, 14 will also depend on the pressure at which it operates—the higher the operating pressure, the higher the power consumption. Thus, e.g., the power consumption of the pumps 12, 14, may also be used to derive the pressure present at the pumps 12, 14. Thus, the system 100 may generally be configured to measure pressures present at different locations of the system 100.

Generally, the operation of a system 100 as depicted in FIG. 6 can be separated in different stages (see also FIG. 1).

One of the stages may be referred to as sample injection: In this stage, an injection volume, which may be specified, of a sample to be analyzed is drawn from the respective vial and introduced into a high pressure flow path.

Another of the stages may be referred to as column loading: the sample (which may also be referred to as sample plug) is transferred from the sample loop 32 to the separation column 50, which may also be referred to as analytical column 50. The column 50 typically comprises a solid phase. Compound(s) of interest interact with the solid phase of the analytical column 50 and are temporarily and reversibly bound. This results in a focusing and enrichment of the analyte(s) of interest on the analytical column 50.

A further stage may be referred to as gradient separation: The reversibly bound analytes are removed step by step from the analytical column 50 during gradient execution and detected by a detector located downstream of the column 50, e.g., by mass spectrometry. With particular reference to gradient separation, it should be understood that in particular, the composition of the solvent may be changed over time. In this regard, the pumps 12, 14 in FIG. 6 may be operated accordingly in such a manner that, e.g., the amount of solvent B in the mixture of A and B is (e.g., continuously) increased (also cf. FIG. 1 in that regard, where the y-axis depicts the concentration of B in the mixture). Such a scheme may be advantageous, as it may increase the resolution, as different compounds of the sample may be eluted at different solvent compositions.

A still further stage may be referred to as washing and equilibration: after separation of the compounds of interest the analytical column 50 is washed with a solvent (e.g., with a highly organic solvent) and then re-equilibrated to the starting condition for the next injection.

Overall, the fluidic system 100 may thus be operated according to a gradient separation scheme, and FIG. 1 depicts the typical stages of a gradient separation described above. Data are only acquired during actual gradient separation step, as is also depicted in FIG. 1, where the data acquisition only occurs during the gradient step.

Embodiments of the present technology are thus particularly directed to loading the separation column 50 in in a fluidic system 100. However, while embodiments of the present technology may be described with particular reference to LC systems and to loading the separation column 50, it should be understood that the described technology is not limited to LC system and to the loading of separation columns 50, but may in fact be employed whenever it is desirable to have a defined volume of fluid flow through a fluidic resistive element.

In this description, the term loading generally refers to the delivery of a defined loading volume over the analytical column 50, which applies to both column loading and column equilibration. In the below, the present technology will be described with particular reference to column loading, and it will be appreciated that in particular for column loading, it may generally be desirable to supply a defined amount of fluid into the column. However, corresponding considerations may also apply to column equilibration— also here, it may be desirable to provide a defined amount of fluid into the column. Again, it should generally be understood that the described technology may be used whenever it is desirable to provide a controlled amount of liquid into a fluidic resistive element.

In the following, concepts facilitating the understanding of the present technology will be described before describing more particular embodiments of the present technology in more detail.

Generally, fluidic resistive elements, such as a separation column 50, can be loaded in different ways.

One way to load a fluid resistive element (i.e., to have an amount of liquid flowing into the element, where it will be appreciated that typically, the same amount of liquid will also flow out of the element) is referred to as flow-controlled loading.

For example, loading of a sample to the analytical column may typically occur flow-controlled. Thus, the sample is delivered to the column at a set constant flow rate $f_{load}$. For example, the pressure may then be set in such a manner that the flow rate is achieved. Hence, loading is completed after a time $t_{load}$ when the volume $V_{load}$ has been delivered, where $$t_{load} = V_{load}/f_{load}.$$

The benefit of this loading approach is that the time required for loading is predictive and thus well-plannable. Therefore, it may be widely employed. However, flow-controlled loading may have several drawbacks.

It may be inefficient: frequently loading could be significantly accelerated if the entire flow/pressure footprint of the chromatography system would be employed. In other words, in flow controlled loading, the flow is set, e.g., to 1 ml/min (though this is a mere example), and in response to this, the pump operates at a pressure of, e.g., 100 bar. If it is desired that 1 ml is used for loading, this loading would take 60 s. However, it may also be possible to operate the system at much higher pressures, e.g., at a pressure of 1,000 bar. If such a high pressure was used, a higher flow of, e.g., 10 ml/min could in principle also be achieved, such that the loading would already be achieved in 6 s. Thus, by having a flow controlled loading, the system may in some instances be operated at pressures substantially below the pressure at which the system could in principle be operated, thus resulting in a longer time for the sample loading than would in fact be necessary.

Furthermore, flow-controlled loading may be inaccurate: if the loading parameters are not chosen adequately the effectively loaded volume can differ significantly from the expected volume. Particularly at elevated pressures this may be related to the compressibility of fluids. Thus, a significant amount of energy is consumed by compressing fluids at the cost of energy available for delivery of the volume through the analytical column.

Flow-controlled loading may also be error-prone: In addition to the afore mentioned issues related to inadequate loading parameters, presence of air or changes to the backpressure of the analytical column are typically not detected and thus can have immediate adverse effects on the loading performance.

Another way to load a fluid resistive element (e.g., a separation column) is referred to as pressure-controlled loading.

Pressure-controlled loading achieves loading at a constant pressure. That is, a pressure is set and the pump(s) are operated at a flow rate resulting at the set pressure. Thereby, the loading volume $V_{load}$ is measured either using flow sensors or by the volumetric displacement (i.e. position of a pump piston). Thus, the loading flow $f_{load}$ varies depending on the backpressure of the fluidic system, particularly the backpressure of the analytical column. As a consequence, the time for loading $t_{load}$ varies accordingly:

$$t_{load}=V_{load}/f_{load}.$$

This must be considered during planning of the chromatography workflow, as there is no constant and predictive/predetermined time for loading when wishing to achieve a defined loading volume.

However, pressure-controlled loading has several advantages over flow-controlled loading. In particular, it may be more efficient, as loading can be performed at the maximum pressure of the fluidic system (similar to the considerations provided above).

Currently, pressure-controlled loading is rarely employed. One example is the ThermoFisher EASY-nLC nano HPLC system. A drawback of the loading mechanism of the EASY-nLC is that the volume measurement is not accurate. It is assumed that loading starts once the loading pressure has been established. However, already during pressurization flow is delivered through the column. Thus, the actual loaded volume is larger than the intended (set) loading volume. Moreover, this discrepancy is dependent on the loading pressure, the compressibility of the fluid and the volume of the conduit which needs to be compressed.

Embodiments of the present technology are directed to loading a volume of a fluid into a fluidic resistive element in a reliable manner, and preferably relatively fast. That is, a defined amount of volume is forced to flow into a fluidic resistive element, and it will be understood that the same amount of fluid is thus also forced to flow out of the fluidic resistive element.

More particularly, in embodiments of the present technology, fast loading is achieved through pressure-controlled loading at high pressure conditions, e.g., at the maximum operating conditions (typically the maximum pressure rating) of the fluidic system for maximum efficiency.

Accuracy and precision may be achieved by a loading control algorithm which takes volume losses during loading due to compressibility of the fluids and volume expansion of the fluidic system into account. When the present technology is employed in an LC system, towards the end of the loading procedure which may be performed in (constant) pressure-controlled mode, a smooth transition to the subsequent gradient phase (i.e. flow-controlled operation) may be achieved.

Additionally, the loading control mechanism may also provide means for diagnostics of the loading process such as incorrect fluid, separation column, fluidic connections or leakages.

In embodiments of the present technology, the compressibility of the fluid(s) is considered for accurate delivery of a compressible fluid volume across a fluidic resistance. It should be understood that, whenever such a fluid is displaced from a stationary state, work is consumed for compression which results in pressure building up in the conduit upstream of the fluidic resistive element, which may also be referred to as a "resistor".

Figure 2:
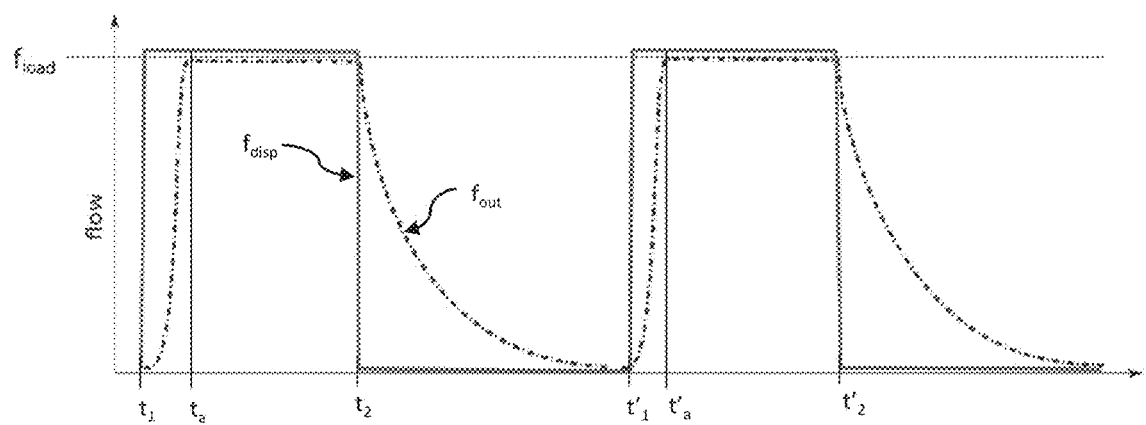
FIG. 2 depicts flow signals as a function of time.

This may be further understood with reference to FIG. 6 (A) and FIG. 2. FIG. 6 (A) generally depicts the loading of a sample that is present in the sample storage section 32 into the separation column 50. For this, a defined amount of solvent is supplied, and this defined amount (i.e., volume) of solvent flows into the separation column 50, and the same amount (i.e., volume) also flows out of the separation column 50.

FIG. 2 depicts volume flows in a fluidic system as the one depicted in FIG. 6 (A) as a function of time. More particularly, FIG. 2 includes two curves, one relating to a displacement flow $f_{disp}$ and the other relating to a flow $f_{out}$ actually delivered through the flow resistor (e.g., the separation column 50). Consider that at the beginning, there is no flow and no pressure provided by the pump (see 12 in FIG. 6 (A)), and the pump 12 starts operating at time t1 in a flow controlled manner, and stops its operation again at time t2.

In the time interval defined by t1 and t2, there will thus be a constant displacement flow $f_{disp}$. However, this will not fully correspond to the flow through the resistor 50. Instead, when the pump 12 starts operating, the fluid upstream of the resistor 50 will be compressed, and this compression accounts for the difference between the displacement flow $f_{disp}$ of the pump and the actual flow $f_{out}$ through the resistor 50. At some time (indicated by $t_a$), the pressure upstream of the resistor 50 will be so high that the flow through the resistor $f_{out}$ is substantially equal to the displacement flow $f_{disp}$, and thus, an equilibrium is reached.

Further consider that at time t2, the flow is switched off, such that no further fluid flow is provided by the pump, i.e., $f_{disp}$ becomes 0. However, as at t2, the fluid upstream of the resistor 50 is still pressurized, there is still flow through the resistor $f_{out}$. The more fluid flows through and out of the resistor, the smaller the pressure in the section upstream of the resistor 50. Thus, this flow $f_{out}$ decreases (exponentially) until there is no more excess pressure upstream of the resistor. The respective process can then also be repeated, as indicated by times $t_1'$, $t_a'$, $t_2'$ corresponding to times $t_1$, $t_a$, $t_2$ discussed before.

As a result, the volume displacement flow $f_{disp}$ of the fluid upstream of the resistor 50 is larger than the corresponding flow $f_{load}$ through the column (and thus downstream of the column) in the interval defined by t1 and ta. This discrepancy between $f_{disp}$ and $f_{load}$ vanishes once an equilibrium state is reached (at time $t_a$). Then the pressure is constant and corresponds to the backpressure value for the given flow rate $f_{disp}$. Now $f_{disp}=f_{load}$ (see FIG. 2). The difference in the respective volumes $V_{disp}$ and $V_{load}$ that were displaced and loaded during this phase is the compression volume $V_{comp}$. Hence, $V_{comp}$ can be determined by pressurizing the system against a blocked outlet, i.e., $f_{load}=0$.

Once the actuation of the fluid is stopped, i.e., $f_{disp}=0$ (see t2), no additional energy is added to the system. The energy which is stored in the compressed fluid is released through an exponentially decreasing flow $f_{out}$ through the resistor 50. The volume which is delivered during this last phase is identical to the compression volume $V_{comp}$ that was initially needed to compress the system. Hence, the loaded volume is equivalent to the displaced volume.

In this process the duration for compression/decompression depends on the volume of the conduit/fluid which is compressed, the compressibility as well as the fluidic resistance. This is analogous to charging/discharging of a capacitor in line with a resistor in an electric circuitry.

Thus, depending on the volume and the fluidic resistance the periods for compression and decompression can contribute significantly to the overall duration of the loading procedure. Particularly the decompression phase may be time-limiting as compression can occur rather quickly with adequate fluidic actuation. For example, compression may be achieved rather quickly by a piston of a pump pushing fluid into a fluidic resistive element. However, decompression by, e.g., a negative displacement of the piston may lead to backflow of the fluid which may change the loaded volume (requiring additional measurement of the volume of fluid that flowed back) or may contaminate the fluid in the pump or a sample storage section that may be connected between the pump and the fluidic resistive element. In the following an approach to accurate but yet fast loading and thus decompression is presented.

Again, with general reference to FIG. 6, it is desirable to cause a defined volume of fluid to flow into the resistor 50, and it will be understood that a substantially corresponding amount of fluid also flows out of the resistor 50. Generally, it is desirable that this amount is well defined and embodiments of the present technology further seek to reduce the time for causing this defined amount of fluid to be forced into the resistor 50.

Thus, embodiments of the present technology relate to a method comprising a defined volume flow step. In the defined volume flow step, a defined volume of a fluid is forced to flow out of the fluidic resistive element 50 (also referred to as resistor 50), e.g., the column 50, and it will be understood that this corresponds to the same volume of fluid flowing into the fluidic resistive element 50. The defined volume is the fluid flowing out of the resistor 50 in a first time interval defined by a time $t_{start}$, which may also be referred to as a start time, and a time $t_{end}$, which may also be referred to as an end time. In this regard, reference may also be made to FIG. 5.

Figure 5:
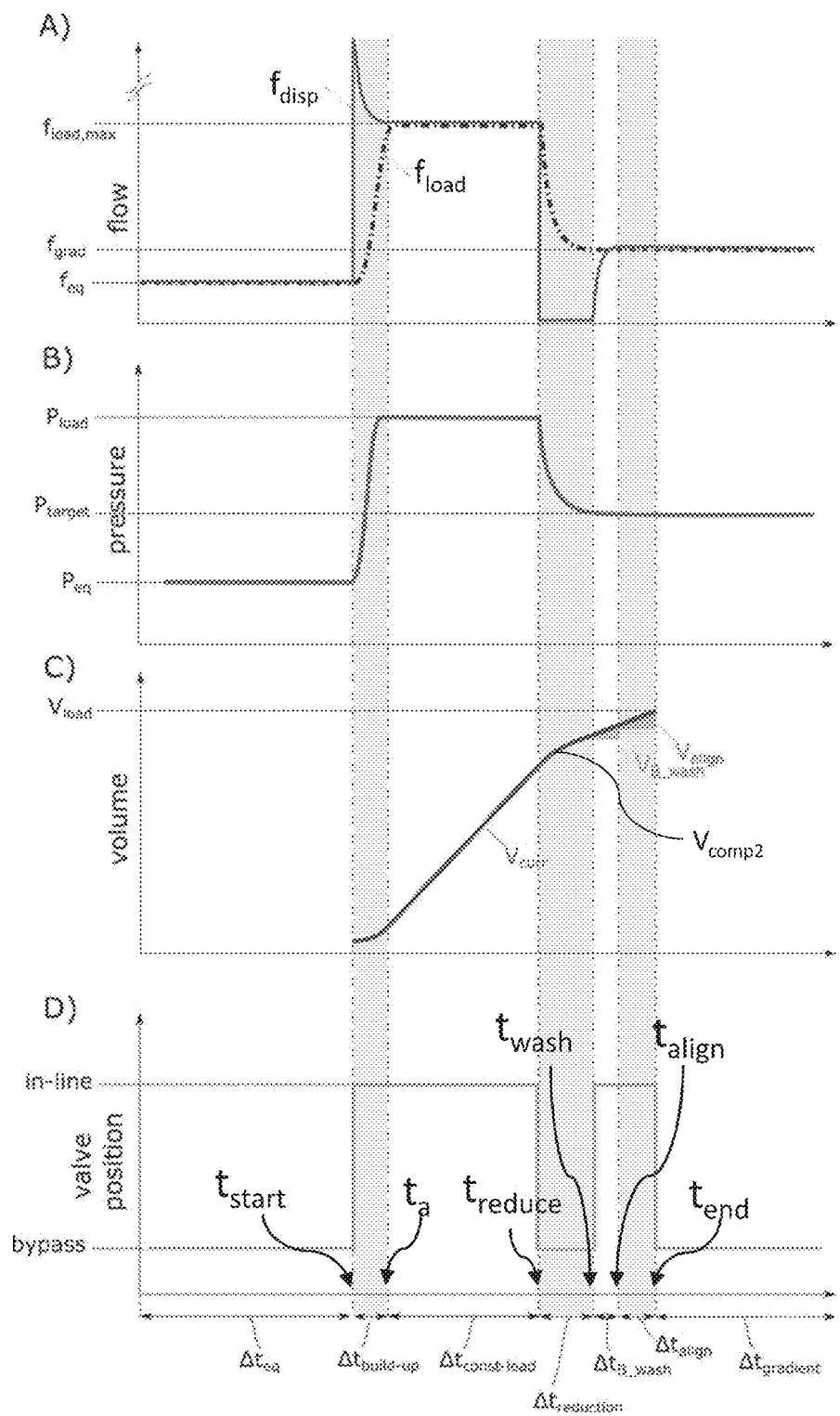
FIG. 5 depicts flow, a pressure, a flow volume, and a valve position signal as functions of time.

FIG. 5 is a schematic illustration of a loading process. FIG. 5 depicts different characteristics as a function of time. More particularly, FIG. 5 (A) depicts a displacement flow $f_{disp}$ caused by the displacement of a pump (which may therefore also be referred to as pumping flow) and a loading flow $f_{load}$ through the resistor 50 as a function of time. Again, it will be understood that the loading flow through the resistor 50 is generally (at least substantially) equal to the flow into the resistor 50 and the flow out of the resistor 50.

FIG. 5 (B) depicts a pressure during loading. Again, FIG. 5 (B) depicts the pressure as a function of time. More particularly, a pressure in the resistor 50 is depicted as a function of time.

FIG. 5 (C) is an illustration of the loading volume over time, which may also include well alignment volume and a washing volume. Again, it will be understood that this is the volume flowing into the fluid resistor 50 (and thus also out of the fluid resistor) as a function of time. It will further be understood that this volume over time is the integral of the loading flow $f_{load}$ depicted in FIG. 5 (A).

Further still, FIG. 5 (D) is an illustration of position of an injection valve according to some embodiments of the present technology during the loading process.

Generally, at a time $t_{start}$, the system may be switched from a first operating state to a second operating state. More particularly, a pump 12 may be switched from operating at a first relatively low pressure to operate at a second higher pressure. Thus, the pressure in the fluid resistor 50 may be brought from a first pressure value $P_{eq}$ to a second pressure value $P_{load}$ (see FIG. 5 (B)), wherein the second pressure value $P_{load}$ exceeds the first pressure value $P_{eq}$.

At a later time $t_{reduce}$ (after the time $t_{start}$ and before or at the time $t_{end}$), the system may be switched to a third operating state to bring the pressure in the resistor 50 to a third pressure value $P_{target}$ below the second pressure value $P_{load}$ (see FIG. 5 (B)).

With reference to FIG. 5 and particularly to FIG. 5 (B) and the different times indicated in FIG. 5 (D), which times are valid for all of Figures (A) to (D), it will be understood that the switching times do not necessarily coincide with the pressure in the fluid resistor (see FIG. 5 (B)) assuming the respective pressure states. For example, the system is switched at time $t_{start}$, and this switching causes the pressure in the resistor 50 to get to the pressure $P_{load}$. However, the pressure $P_{load}$ is not established instantaneously with the switching at time $t_{start}$, but the respective pressure $P_{load}$ is reached after a time interval of $\Delta t_{build-up}$. However, it is still the switching at time $t_{start}$ causing the pressure in the resistor 50 to assume this pressure. Correspondingly, the switching at time $t_{reduce}$ does not necessarily lead to the pressure in the fluid resistor 50 instantaneously assuming the pressure $P_{target}$, but there may again be a time lag between these two. However, again, the switching at time $t_{reduce}$ is causal (i.e., it is at least one of the causes) for the resistor 50 assuming the pressure $P_{target}$ at the time $t_{end}$.

In the following, more particular embodiments of the present technology will be described. Again, it will be understood that embodiments of the present technology relate to causing a defined volume of fluid to flow into a fluid resistive element 50 (and to thus also cause a corresponding volume to flow out of this element 50). In other words, embodiments of the present technology relate to a defined loading process of such a fluid resistive element 50, e.g., a separation column 50. This loading process may have different steps or phases that will be discussed in the following.

The loading process may have an equilibration phase. With reference to FIG. 5, this phase is identified by the time interval $\Delta t_{eq}$. During this phase, a backpressure of the resistor 50 (e.g., the analytical column 50) may be determined.

More particularly, prior to loading, the analytical column 50 is equilibrated. This step is typically performed under isocratic conditions, i.e. the total flow as well as the solvent composition may be constant. More particularly, the solvent composition is typically identical to that used for subsequent loading. Thus, this equilibration phase represents a quasiequilibrium state. This facilitates the determination of the backpressure (fluidic resistance) of the system $R_{sys}$ (analytical column):

$$R_{sys} = P_{eq}/f_{eq}.$$

Herein, $P_{eq}$ is the system pressure and $f_{eq}$ is the flow during the equilibration of the analytical column, respectively.

In this regard, reference can also again be made to FIG. 5, where in the equilibration phase $\Delta t_{eq}$, FIG. 5 (A) depicts the equilibrium flow $f_{eq}$ and FIG. 5 (B) depicts that the equilibrium pressure is present in the resistor 50.

The equilibration phase may be followed by a pressure build-up phase, starting at time $t_{start}$, and lasting for a duration $\Delta t_{build-up}$ (see FIG. 5). In this phase, pressure is built up until either the loading volume $V_{load}$ has been loaded into the resistor 50 (already during the pressure build-up phase), or until the loading pressure $P_{load}$ is reached. The flow $f_{load}$ which is effectively delivered through the resistor 50 at a given timepoint t can be calculated using $R_{sys}$ and the corresponding pressure P(t) in the resistor 50 at this timepoint, $$f_{load}(t) = P(t)/R_{sys}.$$

If the desired loading volume is already loaded into the resistor 50 in the pressure build-up phase, the system is switched to a state allowing rapid reduction of the pressure upstream of the resistor 50, thus rapidly reducing flow into and out of the resistor 50. For example, in such a situation, the pump causing the fluid flow may be switched to a pressure equaling the pressure downstream of the resistor 50. As prior to this switching, the pump 50 typically operates at a higher pressure, this corresponds to an active pressure reduction in the section upstream of the fluid resistor 50, effectively leading to a fast stop of additional flow. However, as may be appreciated by a person skilled in the art, this may not represent a typical scenario and may be indicative of an inadequate choice of method parameters for loading. Such a choice may additionally adversely affect results of a separation process post loading.

Generally, in the pressure build-up phase, the volume $V_{load}$ which has been delivered through the resistor 50, which may be an analytical column, is obtained by integration of $f_{load}$ from the start of the pressure build-up phase $t_{start}$ until a timepoint t:

$$V_{load}(t) = \int_{t_{start}}^{t} f_{load}(t) \partial t.$$

It should be noted that the flow determined by a flow sensor (that may measure the displacement flow caused by the displacement of a pump upstream of the resistor 50) $f_{disp}$ during this phase may not represent the flow through the column, i.e., $f_{disp} \neq f_{load}$. This may be due to the portion $f_{comp}$ of $f_{disp}$, which is contributing to the compression of the fluid volume upstream of the flow resistor 50. Thus, $f_{load} = f_{disp} - f_{comp}$. Hence, the volume that was compressed, $V_{comp}$, can be determined:

$$V_{comp}(M) = V_{disp}(t) - V_{load}(t).$$

Herein, $V_{disp}(t)$ is the volume which was determined by the flow sensors from time $t_{start}$ until time t, $$V_{disp}(t) = \int_{t_{start}}^{t} f_{disp}(t) \partial t.$$

Note that there is no further compression of the fluid after the time $t_a$ (see FIG. 5 (A)), when the displacement flow rate becomes equal to the flow rate measured downstream of the resistor 50. At this point a new "equilibrium state" is reached. Thus, it may be sufficient to determine the volume of fluid compressed at this time. The determination of $V_{comp}$ may be advantageous in ensuring accuracy of the volume of fluid delivered through the resistor 50 in a pressure-controlled loading process. In embodiments of the present technology, the compression volume $V_{comp}$ is determined to improve the accuracy of loading a defined volume into the resistor 50 (e.g., the column 50). This compression volume $V_{comp}$ may then be taken into consideration. In particular, it may be used to determine $V_{comp2}$, which is the volume of fluid delivered to the resistor 50 in the pressure reduction phase (see below; also see FIG. 5 (C)), which may be advantageous in determining $t_{reduce}$, the time at which the constant pressure loading phase ends.

The pressure build-up phase may be followed by a constant pressure loading phase lasting for a duration $\Delta t_{const-load}$ (see FIG. 5). Once a pressure $P_{load}$ has been reached, loading may be continued at constant pressure $P = P_{load}$ until a volume $V_{curr} = V_{load} - V_{comp2} - V_{B\_wash} - V_{align}$ of fluid has been loaded.

Here $V_{comp2}$ is the volume that may be loaded during a pressure reduction phase (see below), $V_{B\_wash}$ is the volume that may be loaded during a flushing of a channel 24 of the pump 14 (see flush-out phase below, also see FIG. 6) and $V_{align}$ is a volume that may be loaded while aligning the solvent composition for starting the gradient separation (see gradient alignment phase below, also see FIG. 6).

While in the present specification, it will be described that all of the volumes $V_{comp2}$, $V_{B\_wash}$, and $V_{align}$ are taken into consideration to determine the time $t_{reduce}$, it will be understood that this is merely exemplary, and that in embodiments of the present technology, only some of these volumes may be taken into consideration.

It may be preferable to have $P_{load}$ higher than $P_{eq}$. It may be further preferred to choose $P_{load}$ equal to or at least substantially equal to the maximum pressure footprint of the system 100. This may allow for an efficient forcing of fluid through the resistor 50. In other words, $P_{load}$ may be chosen to be a relatively high pressure at or close to the maximum pressure rating to the system 100. In particular, it will be understood that by choosing a relatively high pressure, e.g., exceeding 500 bar or even exceeding 1,000 bar, the loading procedure may be accelerated, thereby reducing the time of the loading procedure.

At the end of the loading phase the backpressure $R_{sys2}$ of the system may be determined again. This may be done to account for potential changes of the backpressure of the resistor 50, that may be a separation column, in the course of the loading process. Similar to before, $R_{sys2}$ may be obtained as $R_{sys2} = P_{load}/f_{load}$. Here $f_{load}$ is the flow during the constant pressure loading phase.

During this phase, the loading flow may be equal to the displacement flow, i.e., $f_{load} = f_{disp}$, since compression is completed and thus $f_{comp} = 0$. This is depicted as attainment of equilibrium between the displacement flow and loading flow at time $t_a$ in FIG. 5 (A). Thus, also the following condition may be met assuming that the system is leak-tight: $f_{disp} = f_{load}$. Hence, $f_{disp}$ can be used as an alternative to $f_{load}$ for determining the volume which is loaded during this phase. If there is a discrepancy between the two flows (i.e., $f_{disp} - f_{load} \neq 0$), this may be indicative of a high-pressure leakage of the system. Likewise, a significant discrepancy between $R_{sys2}$ and $R_{sys}$ (particularly when $R_{sys2}$ is significantly smaller), may also be indicative of a leakage at elevated pressures. Thus, these parameters can be employed for system health monitoring purposes. Using $R_{sys2}$, the target pressure $P_{target}$ for a subsequent gradient phase (see gradient phase below) can be calculated as $P_{target}=f_{gradient}*R_{sys2}$, where $f_{gradient}$ is a target flow rate during the gradient phase. $P_{target}$ may be higher than $P_{eq}$.

A pressure reduction phase may follow the constant pressure loading phase. With reference to FIG. 5, this phase is identified by the time interval $\Delta t_{reduction}$. In this phase, the pressure is reduced from the loading pressure $P_{load}$ to the pressure $P_{target}$.

During this phase, the analytical pump may be operated such that the net flow at the pump outlet is regulated to no flow (i.e., $f_{disp}=0$). This is depicted by the displacement flow curve being brought to 0 in FIG. 5 (A) at time $t_{reduce}$. Simultaneously the gradient composition may be maintained. The volume that may be loaded during this phase is $V_{comp2}$. Analogously to the pressure build-up phase, where $V_{comp}$ is the volume that may have been compressed during pressurization of the system, $V_{comp2}$ is the volume that may be delivered during depressurization.

In different embodiments, this reduction in pressure from $P_{load}$ to $P_{target}$ may be achieved differently.

In one embodiment, the analytical pump may actively reduce pressure by negative piston displacement. In this regard, reference may also be made to FIG. 5 (B). It will be appreciated that during the pressure reduction interval $\Delta t_{reduction}$, the pressure falls exponentially. Again, in the depicted embodiment, this is achieved by the pump being switched to zero flow. However, as the fluid upstream of the resistor 50 is compressed, the energy that caused the compression is still stored in the system, and this energy is dissipated by fluid flowing into and then out of the resistor 50 until a still further equilibrium state is reached.

That is, the pump regulates actively to zero flow. Thus no flow exits the pump. However there is still flow downstream of the pump through the fluid resistor (e.g., the analytical column). This results in a pressure decay of the system. Further, the analytical pump internally also contains pressurized volumes. Thus, the pump also needs to follow the pressure decay in order to maintain zero flow. This may be achieved by retracting the piston(s) of the pump accordingly.

However, in embodiments of the present technology, this step may be accelerated by not stopping the flow caused by the pump to be zero, but by actually switching the pump to a new pressure. If, for example, the loading pressure is at 700 bar, and the target pressure $P_{target}$ is at 300 bar, the pump may be switched to the target pressure of 300 bar at time $t_{reduce}$. Thus, the remaining pressure in a high pressure portion (between the pump and the fluid resistor) does not only slowly dissipate as depicted in FIG. 5 (B), but the reduction to $P_{target}$ in fact happens much more rapidly.

That is, in such an operation, the pump no longer operates in a flow controlled mode but in a pressure-controlled mode. This means that the pressure is actively reduced to a lower target value, which may cause a negative flow into the pump. E.g., to assure that the gradient composition is not entirely compromised (i.e. cross flow between channels A & B), the gradient composition may be maintained in this process.

This may allow for a fast and effective pressure reduction. Again, during the negative displacement a net (back) flow into the pump may take place. During this process the solvent composition in A/B solvent channels (see channels 22 and 24 in FIG. 6) of the pumps 12 and 14 may be compromised, i.e., a cross-flow may occur between the two channels. Such active decompression may compromise the solvent composition during the subsequent gradient phase and ultimately the chromatographic performance.

In this regard, reference may be made to FIG. 6 (A). In this Figure, pump 12 with solvent A may be used to push the sample from a sample loop 32 into the fluid resistor 50.

Thus, during the constant loading phase $\Delta t_{const-load}$, pump 12 operates and causes fluid flow at an elevated pressure through the sample loop 32 and into the fluid resistor 50. It will be understood that in FIG. 6, the solvent A is depicted as a solid black line, while the solvent B is depicted as an unfilled black line. These solvents can be mixed at the mixing unit 26.

However, if the pump 12 is used for loading, this pump 12 provides the solvent A at a high pressure, which may lead to solvent A also flowing into channel 24, as depicted in FIG. 6 (A).

Correspondingly, when the pressure is actively reduced, e.g., by a piston of pump 12 retracting a time $t_{reduce}$, this may cause solvent in channel 24 to also flow into channel 22, or the other way round with solvent in channel 22 flowing into channel 24, thereby potentially compromising the solvent composition.

Figure 4:
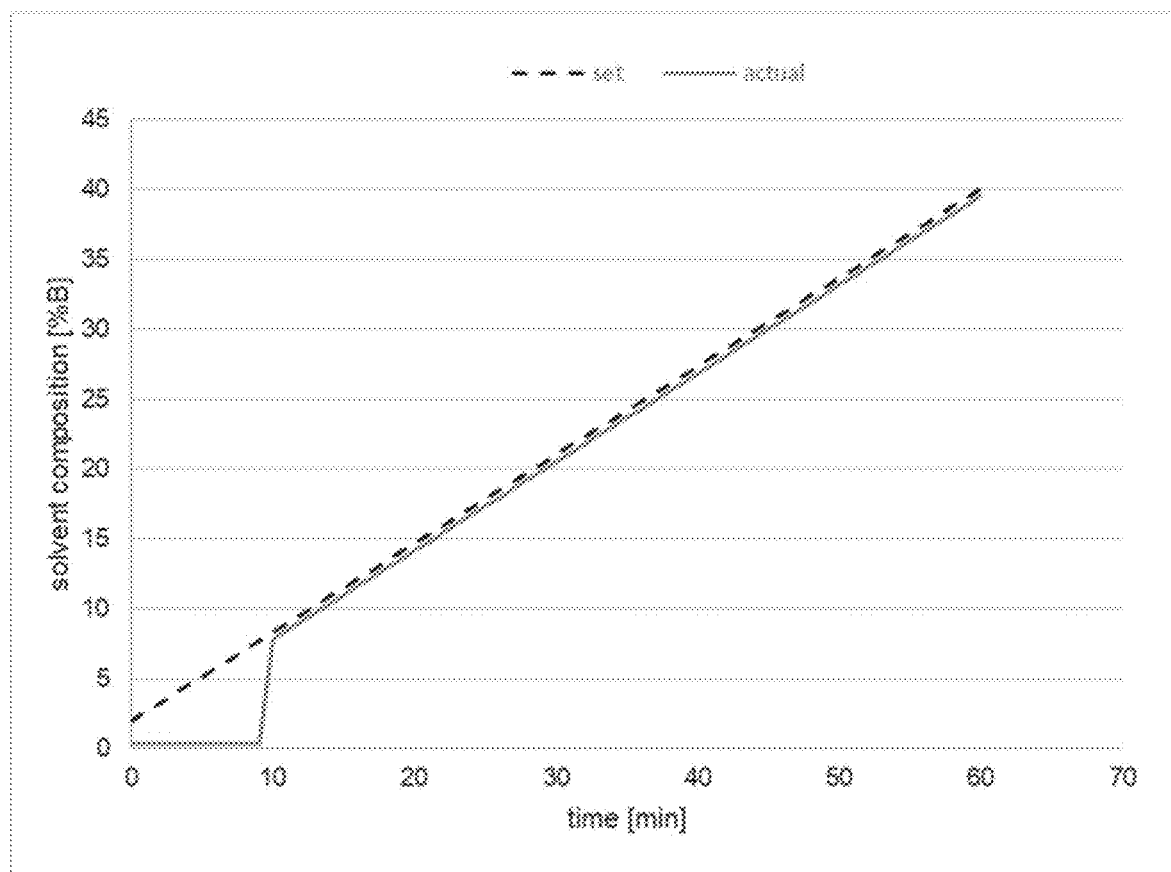
FIG. 4 depicts signals relating to solvent composition in a gradient scheme of a liquid chromatography procedure as a function of time.

In this regard, reference can also be made to FIG. 4. FIG. 4 depicts a solvent composition as set (see dashed line) and the actual solvent composition (see solid line) delivered during an experiment. Again, with reference to FIG. 6 (A), during the preceding phases, it may happen that solvent A is actually pushed into the channel 24 (also see the below description of FIG. 6 in this regard). Thus, when not accounting for this effect and operating the pumps as if only solvent B was present in channel 24, this may lead to less of solvent B being delivered during the initial gradient phase, as depicted in FIG. 4, where the actually provided gradients corresponds to the set gradient only after approximately 10 minutes, when the solvent plug 25 of solvent A present in channel 24 has been removed.

E.g., to counter such compromising effects, an additional gradient alignment step may be used, as explained below.

In another embodiment of the pressure reduction phase, the sample loop 32, that may hold the largest pressurized fluid volume downstream of the pump, may be switched out of the flow path (as in FIG. 6 (D), although it is noted that another step is depicted in this Figure). The flow of the pump may then be stopped (e.g., actively regulated to $f_{disp}=0$) and the flow path may be depressurized through the separation column. Meanwhile, the loop 32 may be depressurized to $P_{target}$ separately (e.g., using a metering device (not shown)).

The effect of switching the loop offline for accelerating the depressurization is shown in FIGS. 3A and 3B based on actual experimental data with different columns. FIGS. 3A and 3B depicts actual measurement data of column loading experiments.

Figure 3:
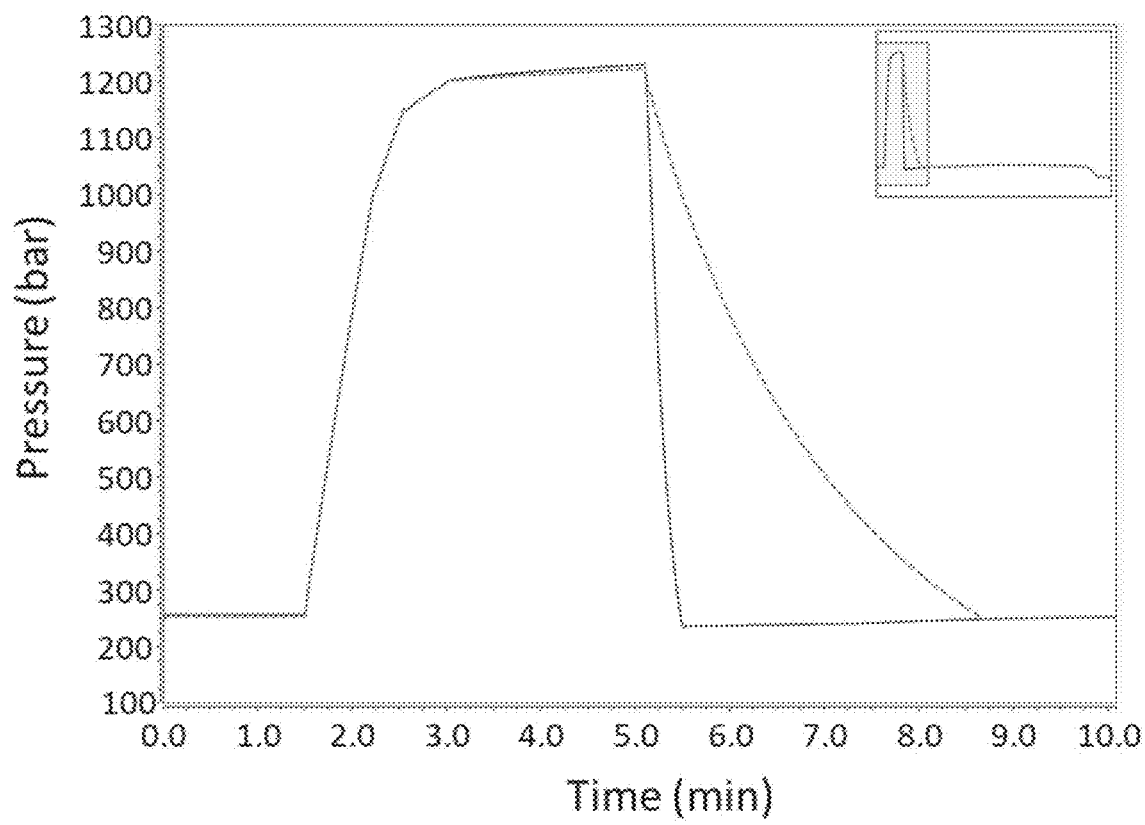
FIGS. 3A and 3B depict pressure and flow signals as functions of time.
Figure 3:
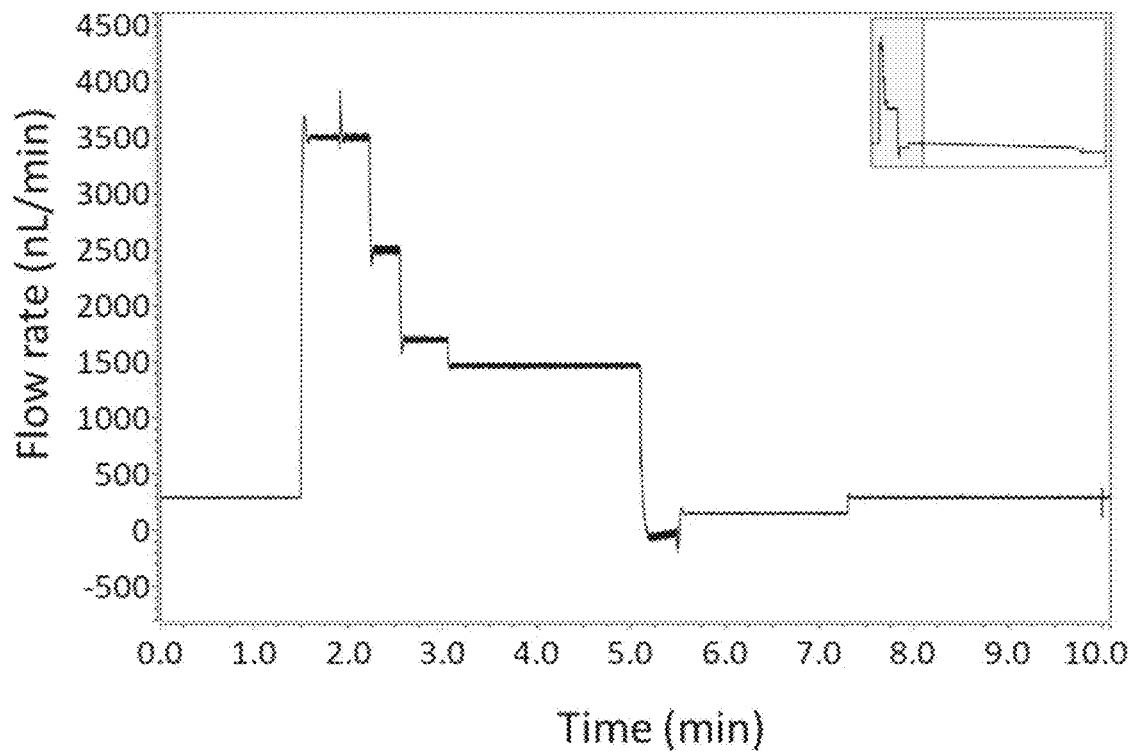

FIG. 3 (A) depicts a comparison of loading procedures. Shown are exemplary data of a pressure signal of a HPLC gradient pump (e.g., a UHPLC pump). More particularly, FIG. 3 (A) depicts two pressure signals as a function of time, wherein the solid line is a pressure signal of an embodiment of the present invention with "active depressurization" and the dashed line is a comparative example without such an active depressurization.

In both signals, at time t=1.5 min the sample pickup is completed, and the loading process starts. Thus, pressure is built-up. At t=3 min, the set pressure for loading (1200 bar) is reached and loading is continued at constant flow or pressure until t=5 min. It will be appreciated that the two signals correspond to one another to this point.

At this time (i.e., at t=5 min), the depressurization phase is started, which may also be referred to as decompression. In the case of decompression where the loop is switched offline (which is one way of performing an active depressurization), the decompression to the target pressure (250 bar) is completed at t=5.5 min (black, continuous line). In the case of depressurization, where the loop is kept inline and no active depressurization is performed, the depressurization to the target pressure is completed at t=8.75 min. At t=10 min the loading is completed, the loop sample loop is switched offline, and the gradient phase begins.

When comparing the solid line (i.e., with active depressurization) to the dashed line (without active depressurization), it will be appreciated that the overall time of reaching the target pressure is greatly reduced, thereby reducing the overall time for an analytical run and thus increasing efficiency.

FIG. 3 (B) shows exemplary data of signals of flow sensor of the A-Channel (see 22 in FIG. 6) of an HPLC gradient pump (e.g., a UHPLC pump) during accelerated loading with active decompression (i.e., with fast decompression) by switching the sample loop offline.

At time t=1.5 min, the pressurization phase starts resulting in an increased flow. Subsequently the flow is step wise decreased to slowly approach the loading pressure. At t=3 min, pressurization is completed and loading of the fluidic resistive element occurs at a constant flow of about 1500 nL/min between time t=3.0 min to t=5.0 min. At t=5 min, the depressurization phase begins, which may also be referred to as pressure reduction phase. The flow is set to zero; thus, the measured flow decays rapidly towards zero flow. Subsequently at t=5.5 min, the flush-out phase of is started, which phase may also be referred to as washing or purging step. In the depicted embodiment, the total flow is set to 300 nL/min and the volume percentage of A and B is 50%. Hence, the measured flow is about 150 nL/min. At t=7.5 min, the alignment phase begins (with a total flow rate=300 nL/min, 0% B), resulting in a flow value of around 300 nL/min. At t=10 min the loading is completed, the sample loop is switched offline, and the gradient phase begins.

During depressurization, the effect of $V_{comp2}$ is related to the total volume of the fluidics downstream of the pump including the volume of the resistor 50 (that may be a separation column). This volume may typically be neglected. In the case when the loop is not switched offline, its volume may contribute significantly to $V_{comp2}$. Analogously to the pressure build-up phase, where $V_{comp}$ is the volume that may have been compressed during pressurization of the system, $V_{comp2}$ is the volume which may be delivered during depressurization. The compression volume $V_{comp}$, may be related to $V_{comp2}$ as, $V_{comp2}=V_{comp}*f$, where f is the ratio of the pressure differences for pressurization/depressurization $$f=(P_{load}-P_{target})/(P_{load}-P_{eq}).$$

This is based on approximating a linear relation between compression volume and pressure, which may typically be sufficient. Nonetheless, other more accurate means for correlating compression volume and pressure may be employed. In many use cases f is ≈1. Thus, the volume that may be loaded during a depressurization phase, $V_{comp2}$, may be determined with the help of $V_{comp}$, that may have been determined in the pressure build-up phase. A robust accounting of the volume $V_{comp2}$ may be advantageous in ensuring accuracy of the defined volume of fluid delivered through the resistor 50, particularly for highly compressible fluids.

In yet another embodiment of the pressure reduction phase, the pressure reduction may be achieved by actively venting the flow path to $P_{ambient}$ using an additional valve upstream of the resistor 50 (that may be a separation column). This approach may for instance be used in the EASY-nLC UHPLC product. This approach may also allow for fast depressurization. However, the rather drastic pressure drop may cause significant stress on the resistor 50 (alternatively, a separation column) and the other fluidics. Hence, the lifetime of the resistor 50 (that may be a separation column) may be reduced significantly under such operation.

Also in such a setup the pressure does not drop instantaneously due to the resistance of the conduits upstream of the column and the valve. Thus, the venting may be controlled to be stopped once the target pressure is reached. This is done, for example, in the EASY-nLC system.

Once $P_{target}$ is reached, the loading may be continued in a flow-controlled mode with $f_{load}$-$f_{gradient}$, where $f_{gradient}$ may be a target flow rate for the gradient separation step.

During the preceding phases, identified by the durations $\Delta t_{eq}$ relating to the equilibration interval, $\Delta t_{build-up}$ relating to the interval when the pressure is built up, $\Delta t_{const-load}$ relating to the interval of loading with a constant pressure, and $\Delta t_{reduction}$ relating to the reduction of the pressure in FIG. 5, a minute cross-flow between the two (or more) solvent channels, such as channels 22 and 24, of the pump may have occurred (see FIG. 6 (A)) as already described above for the pressurization step and the depressurization step.

Such cross-flows may be particularly relevant for high pressure gradient (HPG) pumps, i.e., pumps that may be used particularly in HPLC applications, where solvent(s) may need to be pushed into the flow path at a high pressure. This may result in an inaccurate solvent composition in the channels, as discussed before. As a result, the gradient may not be delivered accurately in the subsequent gradient phase which can have significant adverse effects on the chromatographic performance (see FIG. 4). Such cross-flows may typically occur when the flow ratio between the two (or more) channels of the pump is set such that effectively only one channel is delivering the entire flow (such as e.g., 0% or 100% of a given solvent).

This may be highlighted for a typical low-flow UHPLC (ultra high performance liquid chromatography) scenario (see FIG. 4). The total flow rate may be set to, for example, 300 nL/min, with the solvent composition during the loading step set to 0 vol-% of solvent B, for example. This may allow reliable detection of early eluting compounds during the downstream gradient phase. Thus, the set flow of channel A (channel 22 in FIG. 6 (A)) may be 300 nL/min, while that of channel B (channel 24 in FIG. 6 (A)) may be 0 nL/min. The flow regulation for such low-flow UHPLC pump may rely on flow (or pressure) sensors for accurate flow delivery. However, such sensors may show non-ideal behaviors such as offset flows, drifts, noise as well as accuracy deviations.

Assuming that the flow sensor for solvent B pump (pump 14 in FIG. 6 (A)) may show a minor offset, for example, of 5 nL/min, at actual zero flow, this would actually cause a net negative flow of solvent A into channel 24 of 5 nL/min at the cost of the overall flow delivered to the column 50 (only 295 nL/min of solvent A). Thus, assuming that this scenario would last for, for example, 15 min for equilibration and loading, a solvent plug A of a total volume of 75 nL would have flowed into channel 24 during this time (see 25 in FIG. 6 (A)). The negative effect of this would become imminent during the gradient phase. Assuming, for example, a typical 60 min gradient starting at 2 vol-% of solvent B, ending at 40 vol-% of solvent B, at a flow rate of, for example, 300 nL/min, this would result in no solvent B being introduced during the first 8 minutes of 60 minutes (see FIG. 4). This time of ~8 min would be needed to flush out the volume of 75 nL from channel 24. During this time, the concentration of solvent B in the gradient mixture being pushed into the analytical flow path would have correspondingly increased to ~7 vol-% of solvent B. Hence, the peaks that normally would have gradually eluted during this period would elute all at once with the sudden increase in solvent B composition at t=8 min. Thus, the early phase of chromatogram may be compromised.

E.g., to avoid such negative effects, the channel 24 may be flushed during the end of the loading prior to starting the gradient (see FIG. 6 (B)). This phase may be called a flush out phase of solvent line B (channel 24 in FIG. 6 (A)), identified with the duration $\Delta t_{B\_wash}$ in FIG. 5. To do this, the solvent composition may be briefly increased in favor of the solvent B flow (for e.g. increased to 80 vol-% of solvent B). Then, a predefined volume $V_{B\_flush}$ may be delivered. $V_{B\_flush}$ may be chosen sufficiently large to ensure that channel 24 is reliably filled with solvent B only.

During the flush out phase, it may be advantageous to protect the sample which was partly loaded in the preceding steps to the separation column 50 from the solvent B (which may be organic, for example). That is, it may be advantageous that the solvent used during the flush out phase does not reach the fluid resistor 50 (e.g., the separation column 50). For this purpose, the sample loop 32, which may have been depressurized to $P_{target}$ separately during a depressurization step, may be switched back inline. It may be used as a buffer into which $V_{B\_flush}$ may be stored. Meanwhile, loading of the sample to the separation column 50 may be continued simultaneously. Thus, during this phase the loading volume may be increased by $V_{B\_flush}$.

E.g., to ensure the correct solvent composition $B_{grad,start}$, that may be, for example, 2 vol-% of solvent B and 98 vol-% of solvent A (although it will be understood that this is merely exemplary), for the start of the gradient in the next step, the fluidics may be flushed to remove (incorrect) solvents from the preceding flush-out phase (see FIG. 6 (C)). The solvent composition may be set to $B_{grad,start}$ and a predefined volume $V_{align}$ may be delivered during $\Delta t_{align}$ (see FIG. 5). $V_{align}$ may be chosen sufficiently large to ensure that all fluidics between the pump outlet and the injection valve are filled with solvent of composition $B_{grad,start}$. Meanwhile, loading of the sample to separation column may be continued simultaneously. Thus, during this phase the loading volume may increase by $V_{align}$. This phase may be called a gradient alignment phase, identified with the duration $\Delta t_{align}$ in FIG. 5.

Once, $V_{align}$ has been delivered, loading may be completed and the sample loop 32 which holds the solvent plugs $V_{B\_flush}$ and $V_{align}$ may be switched off-line. There it may be washed separately (e.g., using a metering device).

In a further step, that may be called a gradient phase, identified with the duration $\Delta t_{gradient}$ in FIG. 5, the gradient may be delivered directly, i.e., by bypassing the sample loop 32, to the separation column (see FIG. 6 (D)).

That is, FIG. 6 is a schematic illustration of the fluidic routing according to embodiments of the present technology during the loading process: FIG. 6 (A) depicts loading of the sample from the sample loop to the separation column. This operation can cause a minor backflow of solvent A into channel 24. FIG. 6 (B) depicts that channel 24 is flushed. The solvent B plug is "parked" into the sample loop, Thereby the loading of the sample from the loop is continued. FIG. 6 (C) depicts preparing (aligning) of the solvent composition for the start of the gradient phase. The alignment solvent plug is also "parked" into the sample loop. Thereby, the loading of the sample from the loop is continued. Further, FIG. 6 (D) depicts a state when loading has completed. The loop with the "parked" solvent plugs is switched off-line. The gradient is delivered via the loop bypassed directly to the column.

In other words, FIG. 6 depicts different operation states of a fluidic system 100 that may be used in embodiments of the present technology.

As discussed, embodiments of the present technology may relate to delivering a defined volume of a fluid (e.g., a liquid) to a fluid resistor 50, e.g., to a separation column.

The system 100 may be switched to a state to increase a pressure in the fluid resistor 50 from a first value to a second value exceeding the first value. Again with reference to FIG. 5, this may be done at a time $t_{start}$. With more particular reference to FIG. 6 (A), e.g., a sample may be located in the sample loop 32 and at tie $t_{start}$, loading the sample into the fluid resistor 50 may start.

It will be understood that the system 100 may comprise a valve 34 configured to switch the pumps 12, 14 in fluid connection with the sample loop 32 (as in FIG. 6 (A)) or to switch these pumps in fluid connection with a bypass line 40 (as in FIG. 6 (D)).

When in the connection state as in FIG. 6 (A), the system 100 may be switched at time $t_{start}$ to increase the pressure in the fluid resistor 50. As discussed, the rise in pressure in the fluid resistor 50 may not happen instantaneously, but there may be a certain time lag $\Delta t_{build-up}$ until the pressure in the fluid resistor reaches the desired pressure.

However, already during the time interval $\Delta t_{build-up}$, liquid may flow towards and into the fluid resistor 50, i.e., also this fluid contributes to loading the fluid resistor 50.

Generally, it may be desirable to cause a defined volume of fluid to flow into the resistor 50 in the loading step. In particular, this may be desirable for reproducibility in case of chromatographic uses of the present technology.

After loading has been completed, the system 100 may assume a sample separation configuration. In the sample separation configuration (see FIG. 6 (D)), solvent may be supplied to the resistor 50 and may cause constituents of the sample to be eluted out of the resistor 50 and to be subsequently detected.

It will thus be understood that it may be desirable to load a defined amount of volume into the resistor 50 prior to the separation step.

Again, in the configuration depicted in FIG. 6 (A), the pressure upstream of the resistor 50 may be raised during the interval $\Delta t_{build-up}$. Subsequently, there may be a constant pressure loading phase during the interval $\Delta t_{const-load}$.

During these intervals, volumes of fluid are delivered into the fluid resistor 50.

Afterwards, at time $t_{reduce}$, the system 100 may be switched to a further operation state to lower the pressure in the fluid resistor 50, e.g., to lower the pressure to the pressure level that occurs during the separation step.

This concept relates to a first embodiment of the present technology. In particular, it is noted that thus, i.e., by switching the pressure upstream of the resistor 50 to a higher value than the value later used, a particularly high pressure may be used during loading, thereby rendering loading faster and thus more time efficient.

Additional concepts of embodiments of the present technology relate to determining the time $t_{reduce}$ and to account for additional effects, which may adversely influence the operation of the system when not accounted for.

In particular, it will be understood that after switching the system 100 to the further operation state at $t_{reduce}$, additional amounts of fluid will still be loaded into the resistor. Embodiments of the present embodiment account for these amounts (and also for the amount loaded during the compression, i.e., during the time interval $\Delta t_{build-up}$) to accurately set the time $t_{reduce}$.

Furthermore, as also previously discussed, the operation of the system may lead to plugs of solvent A being located in the solvent line 24 (see FIG. 6 (A)), which may compromise reproducibility.

To counter such effects, there may be a flushing or "purge channel" step as depicted in FIG. 6 (B). During this step, the valve 34 may be in the same configuration as in FIG. 6 (A). However, in this step, the pumps 12, 14 may be operated so that any residual solvent B, A, which is not intended to be in the respective channel 22, 24, is removed from the respective channel 22, 24. Thus, after this step, channel 22 is (at least substantially) free from solvent B (depicted in white) and channel 24 is (at least substantially) free from solvent A (depicted in black).

With reference to FIG. 5 (particularly FIG. 5 (C)), it will be understood that this washing or purging step occurs during the interval $\Delta t_{B\_wash}$, wherein it should be understood that this may also include washing of line 22. With reference to FIG. 5 (C), it will also be understood that an additional amount of volume $V_{B\_wash}$ is thus caused to flow into the fluid resistor 50.

After this washing step, the solvent composition present at the mixing unit 26 may not be ideal for the subsequent separation step. Thus, this step may be followed by a solvent alignment step, as depicted in FIG. 6 (C). Again, the system valve 34 may assume the same position as discussed above in conjunction with FIGS. 6 (A) and (B). During this solvent alignment step, the pumps 12, 14 may be operated such that the solvent composition between the mixing unit 26 and the valve 34 corresponds to the one intended for the start of the separation step.

Again, this step may take a certain time, which may be referred to the solvent alignment time interval $\Delta t_{align}$ (see FIG. 5), and also during this step, additional solvent may be loaded into the resistor, this solvent having a volume of $V_{align}$ (see FIG. 5 (C)).

E.g., after the solvent alignment has been completed, the valve 34 may be switched so that the bypass line 40 is connected to the pumps 12, 14 (see FIG. 6 (D)) and separation may start.

It will be understood that in the above process, the resistor 50 is loaded prior to the separation step during the pressure build up $\Delta t_{build-up}$, during the constant loading phase $\Delta t_{const-load}$, during the pressure reduction phase $\Delta t_{reduction}$, during the washing phase $\Delta t_{B\_wash}$ and during the alignment phase $\Delta t_{align}$.

It will further be understood that the pressure reduction phase, the washing phase, and the alignment phase occur after the system is switched to lower the pressure so that the fluid resistor 50 assumes the target pressure $P_{target}$, wherein the switching occurs at $t_{reduce}$.

Embodiments of the present technology take into consideration the volumes delivered after the switching at $t_{reduce}$. Consider, for example, that the total loading volume should be 10 µl, and that the system is set to expect a decompression volume $V_{comp}$ of 0.5 µl, a washing volume $V_{B\_wash}$ of 0.3 µl and an alignment volume $V_{align}$ of 0.2 µl. Thus, the overall volume contributing to the loading after $t_{reduce}$ would be 1 µl. In such a case, the system would determine $t_{reduce}$ to be the time when 9 µl have already been loaded.

Overall, embodiments of the present technology therefore allow a defined volume of fluid to be loaded into a fluid resistive element in a quick, reliable and reproducible manner.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

While in the above, a preferred embodiment has been described with reference to the accompanying drawings, the skilled person will understand that this embodiment was provided for illustrative purpose only and should by no means be construed to limit the scope of the present invention, which is defined by the claims.

The invention claimed is:

1. A method of operating a fluidic system, wherein the fluidic system comprises a fluidic resistive element,
    wherein the method comprises a defined volume flow step, wherein in the defined volume flow step, a defined volume of a fluid is forced to flow out of the fluidic resistive element, wherein the defined volume is the fluid flowing out of the fluidic resistive element in a first time interval defined by a time $t_{start}$ and a time $t_{end}$,
    wherein the defined volume flow step comprises
    at the time $t_{start}$, switching the system from a first operating state to a second operating state, to bring a pressure in the fluidic resistive element from a first pressure value to a second pressure value, the second pressure value exceeding the first pressure value,
    at a time $t_{reduce}$, which is after the time $t_{start}$ and not later than the time $t_{end}$, switching the system to a third operating state to bring the pressure in the fluidic resistive element to a third pressure value, the third pressure value being below the second pressure value.

2. The method according to claim 1, wherein the fluidic system comprises a high pressure section upstream of the fluidic resistive element, and wherein the fluidic system comprises a pump system upstream of the high pressure section, wherein switching the system from the first operating state to the second operating state comprises switching the pump system.

3. The method according claim 2, wherein switching the system to the third operating state comprises switching the high pressure section to the third pressure value at the time $t_{reduce}$.

4. The method according to claim 2, wherein switching the system to the third operating state comprises switching the pump system to zero flow at the time $t_{reduce}$.

5. The method according to claim 2, wherein the pump system is configured to supply a solvent mixture of a first solvent and a second solvent in different mixing ratios, wherein the pump system comprises a first pump configured to supply the first solvent, a second pump configured to supply the second solvent, and a mixing unit downstream of the first pump and the second pump, wherein the pump system supplies the solvent mixture with the first solvent exceeding 20 vol-% of the solvent mixture, and the first solvent preferably constituting 100% of the solvent mixture in a time interval defined by the time $t_{start}$ and $t_{reduce}$, and wherein the method further comprises at a time $t_{wash}$, which is after the time $t_{reduce}$ and before the time $t_{end}$, switching the pump system and the pump system supplying a washing volume, $V_{B\_wash}$, of the solvent mixture with the second solvent exceeding 20 vol-% of the solvent mixture, and the second solvent preferably constituting 100% of the solvent mixture, after $t_{wash}$.

6. The method according to claim 5, wherein the method further comprises determining $t_{reduce}$, wherein determining $t_{reduce}$ comprises taking into account the washing volume $V_{B\_wash}$.

7. The method according to claim 5, wherein the method comprises at a time, $t_{align}$, which is after the time $t_{wash}$ and before the time $t_{end}$, switching the pump system to supply the solvent mixture with a defined mixing ratio, wherein the method further comprises the pump system supplying an alignment volume $V_{align}$ of the solvent mixture with the defined mixing ratio in an alignment time interval $\Delta t_{align}$ starting at the time $t_{align}$, wherein the alignment time interval $\Delta t_{align}$ preferably ends at the end time $t_{end}$.

8. The method according to claim 7, wherein the method further comprises determining $t_{reduce}$, wherein determining $t_{reduce}$ comprises taking into account the alignment volume $V_{align}$.

9. The method according to claim 1, wherein the method comprises a pressurization time interval $\Delta t_{build-up}$ between the start time $t_{start}$ and a time $t_a$, wherein a pressure in the fluidic resistive element rises from the first pressure value to the second pressure value, and wherein the method comprises determining a build up volume $V_{build-up}$ of fluid flowing out of the fluidic resistive element in the pressurization time interval $\Delta t_{build-up}$, and wherein the method further comprises a constant pressure time interval $\Delta t_{const-load}$ between the time $t_a$ and $t_{reduce}$, wherein the pressure in the fluidic resistive element is at the second pressure value during the constant pressure time interval $\Delta t_{const-load}$, and wherein the method comprises determining a constant pressure volume $V_{const-load}$ of fluid flowing out of the fluidic resistive element in the constant pressure time interval $\Delta t_{const-load}$, and wherein the method further comprises a depressurization time interval $\Delta t_{reduction}$, which starts at the time $t_{reduce}$, wherein the pressure is reduced from the second pressure value to the third pressure value, and wherein the method comprises determining a reduction volume $V_{reduce}$ of fluid flowing out of the fluidic resistive element in the depressurization time interval $\Delta t_{reduction}$.

10. The method according to claim 9, wherein the method further comprises determining traduce, wherein determining traduce comprises taking into account any of the build up volume $V_{build-up}$, the constant pressure volume $V_{const-load}$, and the constant reduction volume $V_{reduce}$.

11. The method according to claim 1, wherein the fluidic system is a liquid chromatography system and preferably a high performance liquid chromatography system.

12. A fluidic system, wherein the fluidic system comprises a fluidic resistive element, wherein the fluidic system comprises a control unit, and wherein the fluidic system is configured to perform the method according to claim 1.

13. A computer program product comprising instructions, wherein the instructions are configured, when run on a control unit of a fluidic system, to cause the fluidic system to perform the method according to claim 1.

* * * * *